(12) United States Patent
Sasaki et al.

(10) Patent No.: US 11,718,973 B2
(45) Date of Patent: Aug. 8, 2023

(54) CONSTRUCTION MANAGEMENT DEVICE, DISPLAY DEVICE, AND CONSTRUCTION MANAGEMENT METHOD

(71) Applicant: Komatsu Ltd., Tokyo (JP)

(72) Inventors: Ryo Sasaki, Tokyo (JP); Yasufumi Uehara, Tokyo (JP); Azumi Ichikawa, Tokyo (JP)

(73) Assignee: Komatsu Ltd., Tokyo (JP)

( * ) Notice: Subject to any disclaimer, the term of this patent is extended or adjusted under 35 U.S.C. 154(b) by 665 days.

(21) Appl. No.: 16/647,675

(22) PCT Filed: Feb. 19, 2019

(86) PCT No.: PCT/JP2019/006026
§ 371 (c)(1),
(2) Date: Mar. 16, 2020

(87) PCT Pub. No.: WO2019/167717
PCT Pub. Date: Sep. 6, 2019

(65) Prior Publication Data
US 2020/0232179 A1 Jul. 23, 2020

(30) Foreign Application Priority Data
Feb. 28, 2018 (JP) ................................. 2018-035664

(51) Int. Cl.
*E02F 3/43* (2006.01)
*E02F 9/22* (2006.01)
*E02F 9/26* (2006.01)

(52) U.S. Cl.
CPC .......... *E02F 3/435* (2013.01); *B60Y 2200/412* (2013.01); *E02F 9/2285* (2013.01); *E02F 9/2296* (2013.01); *E02F 9/265* (2013.01)

(58) Field of Classification Search
CPC ....... E02F 3/435; E02F 9/2285; E02F 9/2296; E02F 9/265; E02F 9/2041; E02F 9/262;
(Continued)

(56) References Cited

U.S. PATENT DOCUMENTS

2006/0026101 A1* 2/2006 Ogura ...................... E02F 9/26
705/50
2014/0100712 A1 4/2014 Nomura et al.
(Continued)

FOREIGN PATENT DOCUMENTS

CN 106029991 10/2016
CN 106068354 11/2016
(Continued)

OTHER PUBLICATIONS

Translation of JP/2017/032171 (Year: 2017).*

*Primary Examiner* — Russell Frejd
(74) *Attorney, Agent, or Firm* — Fish & Richardson P.C.

(57) ABSTRACT

A bucket position acquisition unit acquires a plane position of a contour point of a bucket in a plan view from the top and a height thereof from a work machine having work equipment including a boom, an arm, and the bucket. A current status landform update unit updates a height in current status landform data related to the plane position of the bucket to an upper value on the basis of the height of the bucket in a case where a work state is a predetermined work state.

10 Claims, 14 Drawing Sheets

(58) Field of Classification Search
CPC ... E02F 9/2025; E02F 9/261; B60Y 2200/412
See application file for complete search history.

(56) References Cited

U.S. PATENT DOCUMENTS

| | | | |
|---|---|---|---|
| 2016/0024757 A1 | 1/2016 | Nomura et al. | |
| 2017/0175364 A1* | 6/2017 | Hasegawa | G06T 11/40 |
| 2017/0268204 A1 | 9/2017 | Shimano et al. | |
| 2017/0284070 A1 | 10/2017 | Matsuyama et al. | |
| 2018/0218301 A1* | 8/2018 | Shike | G06Q 30/0645 |
| 2018/0218304 A1* | 8/2018 | Shike | G06Q 10/0631 |
| 2018/0327997 A1 | 11/2018 | Fujii et al. | |
| 2019/0127946 A1 | 5/2019 | Sakai et al. | |
| 2020/0388043 A1* | 12/2020 | Nemoto | H04N 13/243 |

FOREIGN PATENT DOCUMENTS

| | | | | |
|---|---|---|---|---|
| CN | 106687645 | | 5/2017 | |
| CN | 107532400 | | 1/2018 | |
| EP | 3272947 | | 1/2018 | |
| JP | 2006200185 | | 8/2006 | |
| JP | 2014074315 | | 4/2014 | |
| JP | 2016098535 | | 5/2016 | |
| JP | 2017032171 | * | 6/2017 | ............... E02F 3/32 |
| JP | 2017166308 | | 9/2017 | |
| JP | 2018003514 | | 1/2018 | |
| WO | 2014167740 | | 10/2014 | |

\* cited by examiner

CONSTRUCTION MANAGEMENT DEVICE, DISPLAY DEVICE, AND CONSTRUCTION MANAGEMENT METHOD

CROSS-REFERENCE TO RELATED APPLICATIONS

This application claims priority to International Application No. PCT/JP2019/006026, filed on Feb. 19, 2019, which claims priority to Japanese Patent Application No. 2018-035664, filed on Feb. 28, 2018. The contents of the prior applications are incorporated herein in their entirety.

TECHNICAL FIELD

The present invention relates to a loading machine control device and a control method which control a loading machine at a work site where the loading machine and a transport vehicle are disposed.

BACKGROUND ART

PTL 1 discloses a technique in which current status landform data is generated on the basis of information regarding a position where a bucket has passed in order to obtain a current status landform deformed as a result of a construction object being constructed by a work machine. Specifically, according to the method disclosed in PTL 1, a construction management device specifies a trajectory of a bucket teeth on the basis of position data of the bucket teeth, and updates a height in current status landform data to a height at which the bucket teeth has passed in a case where the height of the position where the bucket teeth has passed is lower than the height in the current status landform data.

CITATION LIST

Patent Literature

[PTL 1] PCT International Publication No. WO2014/167740

DISCLOSURE OF INVENTION

Technical Problem

The technique disclosed in PTL 1 is directed to obtaining the latest current status landform in excavation work using a work machine, and thus landform data is updated on the basis of the lowest point of the bucket teeth. On the other hand, in a case where a work machine performs banking work, since the bucket is operated at a position higher than a height of a construction object in the current status, current status landform data is not updated, and is thus deviated from an actual current status landform.

An object of the present invention is to provide a construction management device, a display device, and a construction management method capable of updating current status landform data during banking work using a work machine.

Solution to Problem

According to a first aspect of the present invention, there is provided a construction management device including a current status landform storage unit that stores current status landform data that is three-dimensional data representing a current status landform of a construction object; a bucket position acquisition unit that acquires a plane position of a contour point of a bucket in a plan view from the top and a height thereof from a work machine having work equipment including a boom, an arm, and the bucket; and a current status landform update unit updates a height in the current status landform data related to the plane position of the bucket to an upper value on the basis of the height of the bucket in a case where a work state is a predetermined work state.

Advantageous Effects of Invention

According to at least one of the aspects, the construction management device can update current status landform data during banking work using a work machine.

BEST MODE FOR CARRYING OUT THE INVENTION

Hereinafter, with reference to the drawings, embodiments will be described in detail.

<Coordinate System>

Figure 1:
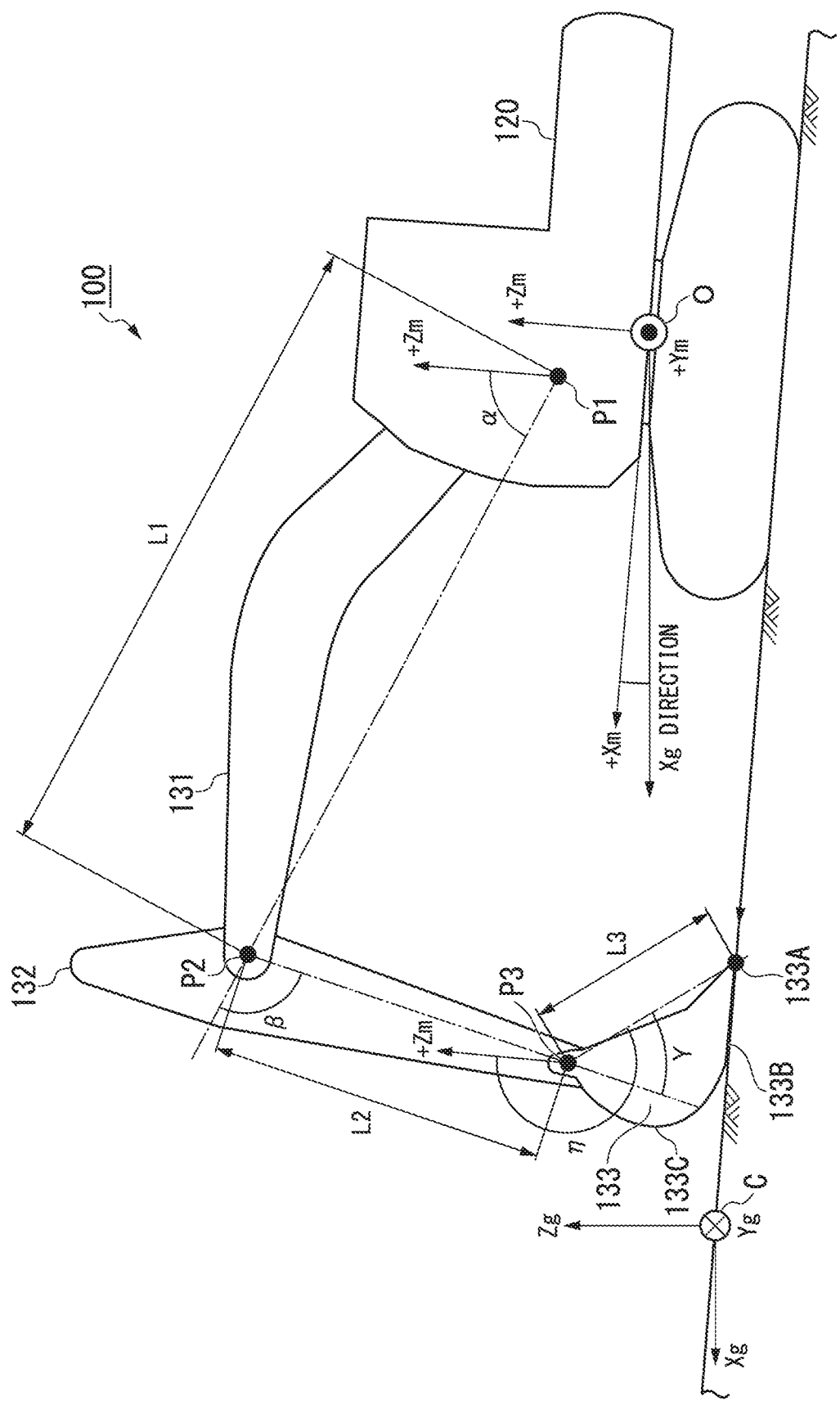
FIG. 1 is a diagram showing an example of a pose of work equipment.

FIG. 1 is a diagram showing an example of a pose of work equipment.

In the following description, a three-dimensional site coordinate system (Xg, Yg, Zg) and a three-dimensional vehicle body coordinate system (Xm, Ym, Zm) are defined, and a positional relationship will be described on the basis thereof.

The site coordinate system is a coordinate system having an Xg axis extending north and south, a Yg axis extending east and west, and a Zg axis extending in a vertical direction, with a position of a GNSS reference station provided at a construction site as a reference point. An example of a GNSS may include a global positioning system (GPS).

The vehicle body coordinate system is a coordinate system having an Xm axis extending in a front-rear direction, a Ym axis extending a leftward-rightward direction, and a Zm axis extending a upward-downward direction, with a representative point O defined in a swing body 120 of a hydraulic excavator 100 which will be described later as a reference. With the representative point O of the swing body 120 as a reference, the front direction will be referred to as a +Xm direction, the rear direction will be referred to as a −Xm direction, the leftward direction will be referred to as +Ym direction, the rightward direction will be referred to as −Ym direction, the upward direction will be referred to as +Zm direction, and the downward direction will be referred to as a −Zm direction.

A work equipment control device 126 of the hydraulic excavator 100 which will be described later may convert a position in a certain coordinate system into a position in another coordinate system through calculation. For example, the work equipment control device 126 may convert a position in the vehicle body coordinate system into a position in the site coordinate system, and may also reversely perform conversion.

First Embodiment

Figure 2:
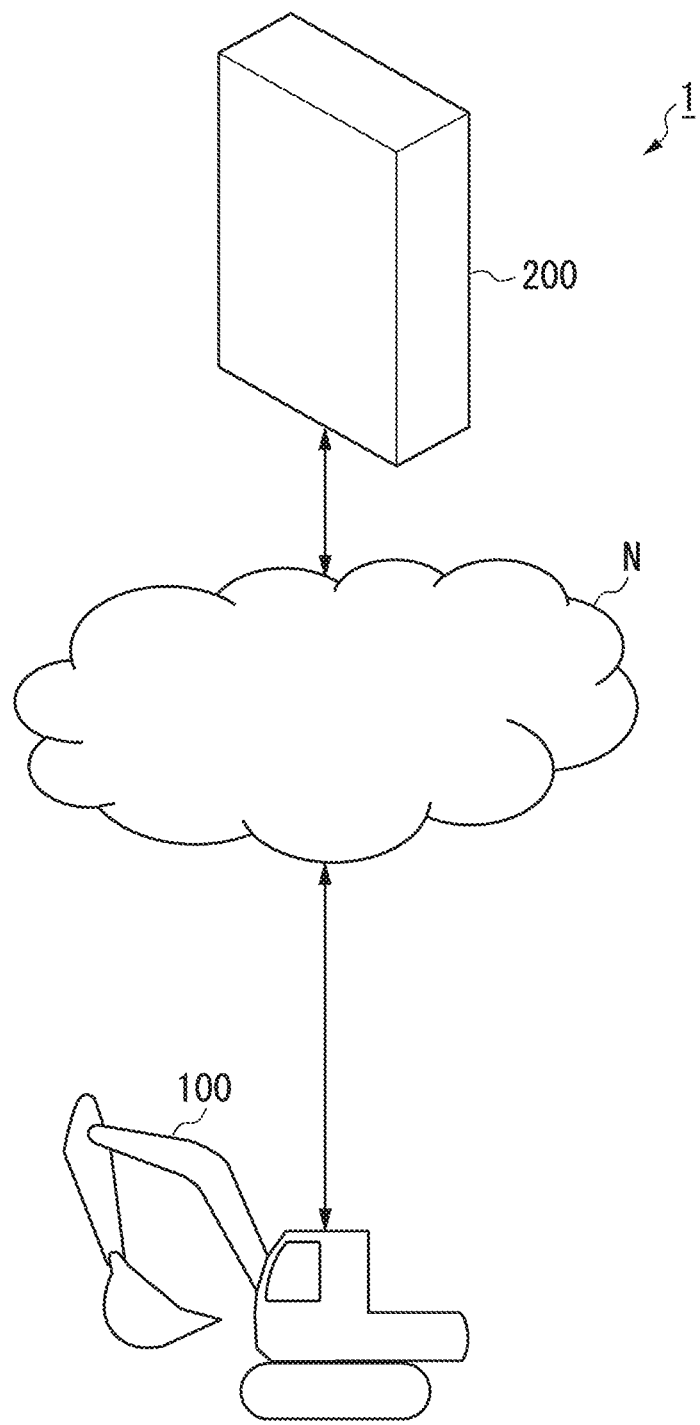
FIG. 2 is a schematic diagram showing a configuration of a construction management system according to a first embodiment.

FIG. 2 is a schematic diagram showing a configuration of a construction management system according to a first embodiment.

A construction management system 1 includes a hydraulic excavator 100 and a construction management device 200. The hydraulic excavator 100 and the construction management device 200 are coupled to each other via a network N. The hydraulic excavator 100 is an example of a work machine. A work machine according to other embodiments may not necessarily be the hydraulic excavator 100. The hydraulic excavator 100 transmits position information of a plurality of contour points including teeth of a bucket 133, related to the site coordinate system, to the construction management device 200.

The construction management device 200 generates current status landform data of a construction site on the basis of the position information of the plurality of contour points of the bucket 133, acquired from the hydraulic excavator 100.

<<Hydraulic Excavator>>

Figure 3:
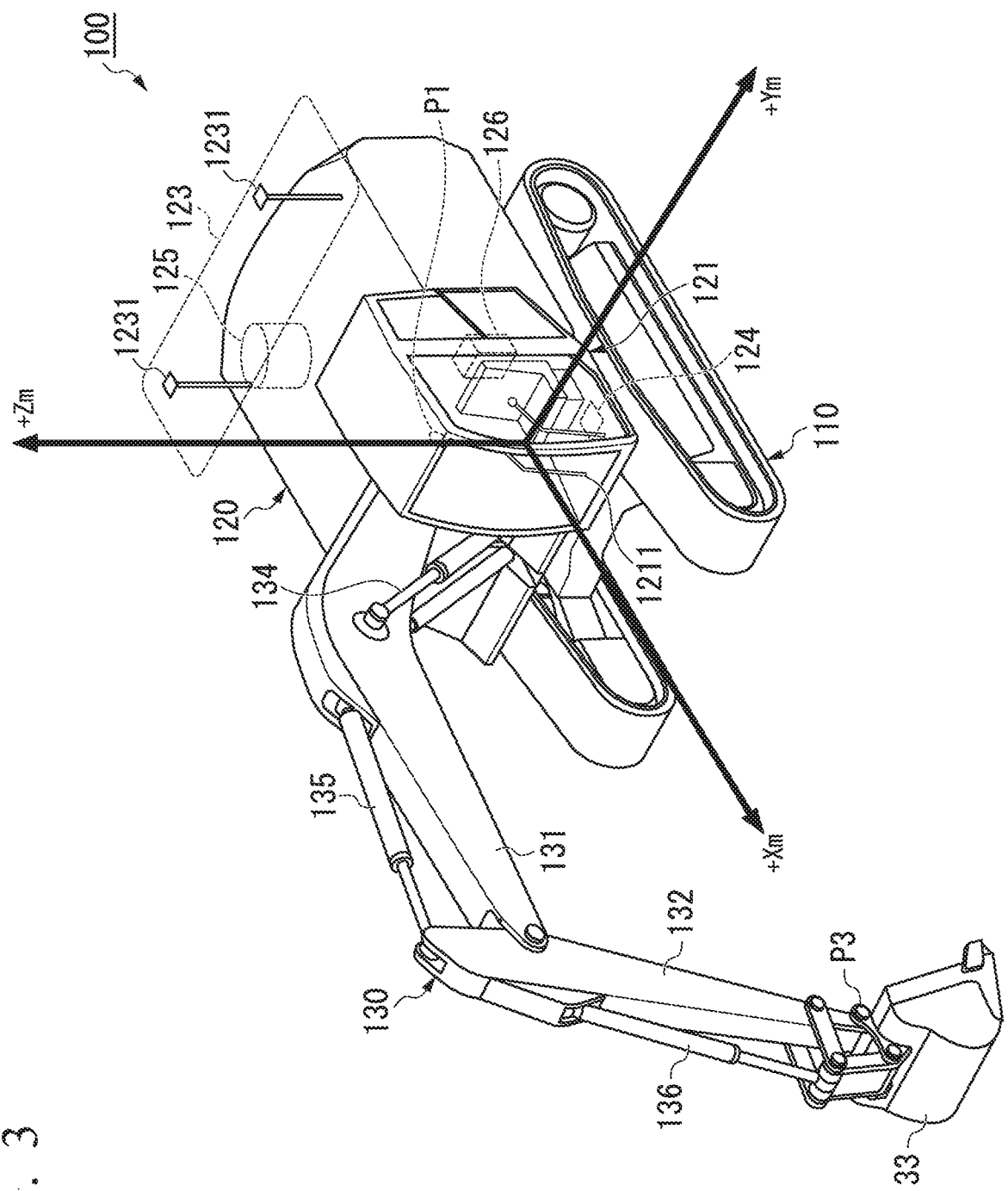
FIG. 3 is a perspective view showing a configuration of a hydraulic excavator according to the first embodiment.

FIG. 3 is a perspective view showing a configuration of the hydraulic excavator according to the first embodiment.

The hydraulic excavator 100 includes a traveling body 110, a swing body 120 supported at the traveling body 110, and work equipment 130 that is operated by hydraulic pressure and is supported at the swing body 120. The swing body 120 is supported to be swingable at the traveling body 110 with a swing center as the center.

The work equipment 130 includes a boom 131, an arm 132, a bucket 133, a boom cylinder 134, an arm cylinder 135, and a bucket cylinder 136.

A basal end part of the boom 131 is attached to the swing body 120 via a boom pin P1.

The arm 132 connects the boom 131 to the bucket 133. A basal end part of the arm 132 is attached to a distal end part of the boom 131 via an arm pin P2.

The bucket 133 is provided with teeth excavating earth or the like and an accommodation part accommodating excavated earth or the like. A basal end part of the bucket 133 is attached to a distal end part of the arm 132 via a bucket pin P3. The bucket 133 may be a bucket used for ground leveling such as a slope bucket, and may be a bucket not having an accommodation part.

The boom cylinder 134 is a hydraulic cylinder used to operate the boom 131. A basal end part of the boom cylinder 134 is attached to the swing body 120. A distal end part of the boom cylinder 134 is attached to the boom 131.

The arm cylinder 135 is a hydraulic cylinder used to drive the arm 132. A basal end part of the arm cylinder 135 is attached to the boom 131. A distal end part of the arm cylinder 135 is attached to the arm 132.

The bucket cylinder 136 is a hydraulic cylinder used to drive the bucket 133. A basal end part of the bucket cylinder 136 is attached to the arm 132. A distal end part of the bucket cylinder 136 is attached to the bucket 133.

The swing body 120 is provided with a cab 121 for an operator to get in. The cab 121 is provided on the front side of the swing body 120 and the left side (+Ym side) of the work equipment 130. An operation device 1211 used to operate the work equipment 130 is provided inside the cab 121. Hydraulic oils are supplied to the boom cylinder 134, the arm cylinder 135, and the bucket cylinder 136 according to an operation amount on the operation device 1211, and thus the work equipment 130 is driven.

<<<Control System of Hydraulic Excavator>>>

Figure 4:
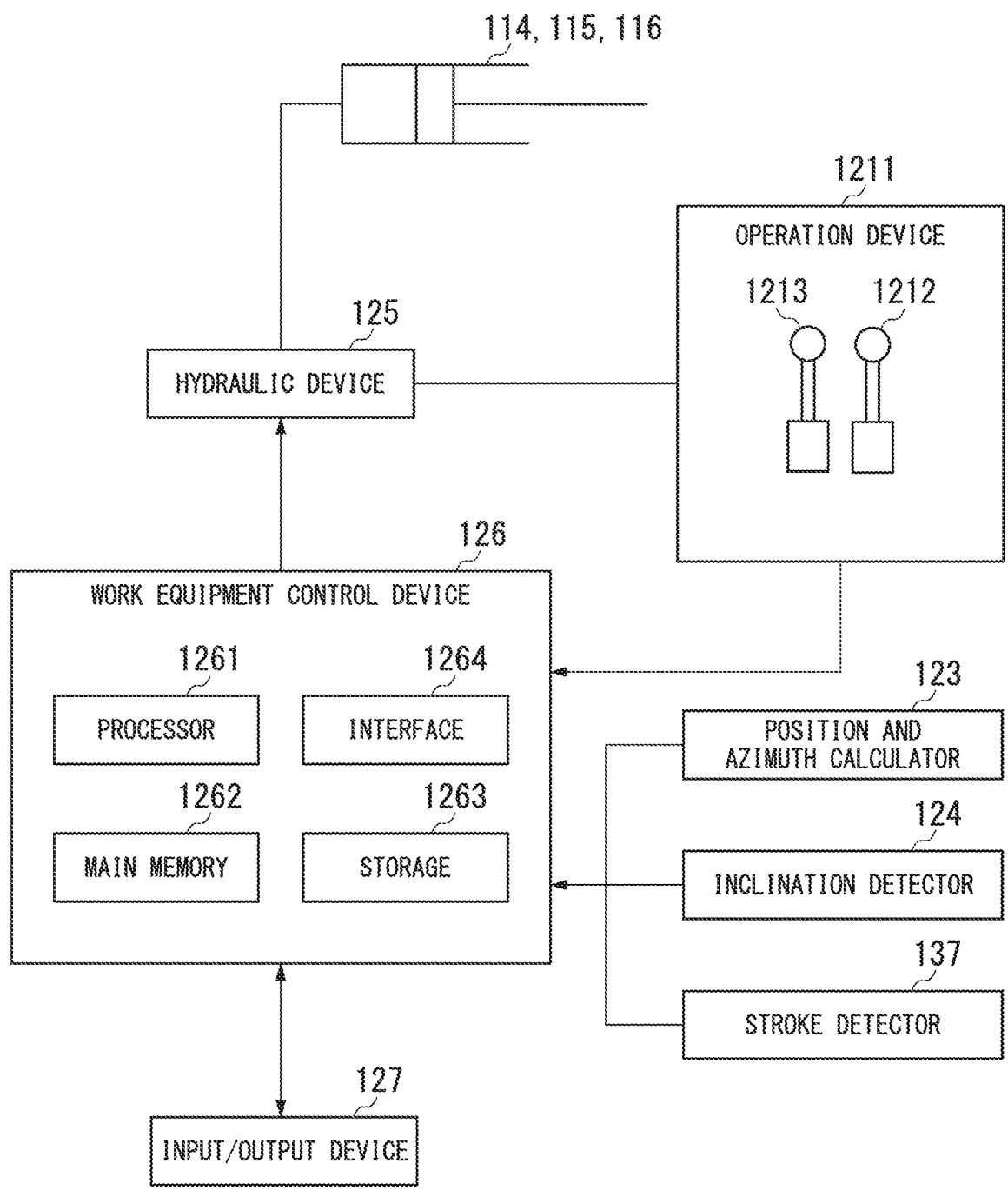
FIG. 4 is a schematic block diagram showing a configuration of a control system of the hydraulic excavator according to the first embodiment.

FIG. 4 is a schematic block diagram showing a configuration of a control system of the hydraulic excavator according to the first embodiment.

The hydraulic excavator 100 includes a stroke detector 137, the operation device 1211, a position and azimuth calculator 123, an inclination detector 124, a hydraulic device 125, the work equipment control device 126, and an input-output device 127.

The stroke detector 137 detects a stroke length of each of the boom cylinder 134, the arm cylinder 135, and the bucket cylinder 136. Consequently, the work equipment control device 126 may detect a position and a pose angle of the work equipment 130 including the bucket 133 in the vehicle body coordinate system on the basis of the stroke length of each of the boom cylinder 134, the arm cylinder 135, and the bucket cylinder 136.

The operation device 1211 includes an operation lever 1212 provided on the right side of the cab 121, and an operation lever 1213 provided on the left side of the cab 121. The operation device 1211 detects operation amounts on the operation lever 1212 in the front-rear direction and the leftward-rightward direction and operation amounts on the operation lever 1213 in the front-rear direction and the leftward-rightward direction, and outputs operation signals corresponding to the detected operation amounts to the work equipment control device 126. A method of generating an operation signal in the operation device 1211 according to the first embodiment is a pressure proportional control (PPC) method. The PPC method is a method in which pilot hydraulic pressures generated by operating the operation lever 1212 and the operation lever 1213 are detected by a pressure sensor, and operation signals are generated. An operation of the boom 131, an operation of the arm 132, an operation of the bucket 133, and a swing operation of the swing body 120 are performed by the operation lever 1212 and the operation lever 1213.

The position and azimuth calculator 123 calculates a position of the swing body 120 and an azimuth in which the swing body 120 is directed, in the site coordinate system. The position and azimuth calculator 123 includes a first receiver 1231 and a second receiver 1232 receiving positioning signals from artificial satellites forming a GNSS. The first receiver 1231 and the second receiver 1232 are provided on the swing body 120 at different positions. The position and azimuth calculator 123 detects a position of a representative point O (the origin of the vehicle body coordinate system) of the swing body 120 in the site coordinate system on the basis of a positioning signal received by the first receiver 1231.

The position and azimuth calculator 123 calculates an azimuth of the swing body 120 in the site coordinate system by using a positioning signal received by the first receiver 1231 and a positioning signal received by the second receiver 1232.

The inclination detector 124 measures acceleration and angular velocity of the swing body 120, and detects a pose (for example, a roll representing rotation about the Xm axis, a pitch representing rotation about the Ym axis, and a yaw representing rotation about the Zm axis) of the swing body 120 on the basis of a measurement result. The inclination detector 124 is provided on, for example, a lower surface of the cab 121. The inclination detector 124 may be, for example, an inertial measurement unit (IMU).

The hydraulic device 125 includes a hydraulic oil tank, a hydraulic pump, a flow rate control valve, and an electromagnetic proportional control valve (not shown). The hydraulic pump is driven by power of an engine (not shown), and supplies hydraulic oils to the boom cylinder 134, the arm cylinder 135, and the bucket cylinder 136 via a flow rate adjustment valve. The electromagnetic proportional control valve restricts a pilot hydraulic pressure supplied from the operation device 1211 on the basis of a control command received from the work equipment control device 126. The flow rate control valve has a rod-shaped spool, and adjusts flow rates of hydraulic oils supplied to the boom cylinder 134, the arm cylinder 135, and the bucket cylinder 136 according to a position of the spool. The spool is driven by a pilot hydraulic pressure adjusted by the electromagnetic proportional control valve.

The work equipment control device 126 specifies a position and a pose of the bucket 133 in the site coordinate system on the basis of the position and the azimuth of the swing body 120 calculated by the position and azimuth calculator 123, an inclined angle of the swing body 120 detected by the inclination detector 124, and the stroke length detected by the stroke detector 137. The work equipment control device 126 outputs a control command for the boom cylinder 134, a control command for the arm cylinder 135, and a control command for the bucket cylinder 136 to the electromagnetic proportional control valve of the hydraulic device 125.

The input-output device 127 displays a screen on the basis of a signal from the work equipment control device 126. The input-output device 127 generates an input signal in response to a user's operation, and outputs the input signal to the work equipment control device 126. Examples of the input-output device 127 may include a touch panel, a monitor, and a portable terminal. The input-output device 127 may be provided in the cab of the hydraulic excavator 100, and may be provided in, for example, a remote control room used to remotely operate the hydraulic excavator 100 outside the cab.

<<Pose of Work Equipment>>

Here, with reference to FIG. 1, a description will be made of a position and a pose of the work equipment 130. The work equipment control device 126 calculates a position and a pose of the work equipment 130, and generates a control command for the work equipment 130 on the basis of the position and the pose. The work equipment control device 126 calculates a boom angle $\alpha$ that is a pose angle of the boom 131 using the boom pin P1 as a reference, an arm angle $\beta$ that is a pose angle of the arm 132 using the arm pin P2 as a reference, a bucket angle $\gamma$ that is a pose angle of the bucket 133 using the bucket pin P3 as a reference, and positions of contour points of the bucket 133 in the vehicle body coordinate system. The contour points of the bucket 133 are a plurality of points set at predetermined positions along a contour of the bucket 133. The contour points according to the present embodiment include a point of the teeth of the bucket 133, a point on a bottom surface of the bucket 133, and a plurality of points of a heel portion of the bucket 133. In other embodiments, the contour points may not be points related to the positions as long as the points are along a contour of the bucket 133. In other embodiments, the number of contour points may be one.

The boom angle $\alpha$ is represented by an angle formed between a half straight line extending in the upward direction (+Zm direction) of the swing body 120 from the boom pin P1 and a half straight line extending to the arm pin P2 from the boom pin P1. The upward direction (+Zm direction) of the swing body 120 and the vertical upward direction (+Zg direction) do not necessarily match each other due to a pose (pitch angle) $\theta$ of the swing body 120.

The arm angle $\beta$ is represented by an angle formed between a half straight line extending to the arm pin P2 from the boom pin P1 and a half straight line extending to the bucket pin P3 from the arm pin P2.

The bucket angle $\gamma$ is represented by an angle formed between the half straight line extending to the bucket pin P3 from the arm pin P2 and a half straight line extending to the teeth of the bucket 133 from the bucket pin P3.

Here, a bucket terminal angle of the bucket 133 using the swing body 120 as a reference is the same as a sum of the boom angle $\alpha$, the arm angle $\beta$, and the bucket angle $\gamma$. The bucket terminal angle $\eta$ is the same as an angle formed between a half straight line extending in the upward direction (+Zm direction) of the swing body 120 from the bucket pin P3 and the half straight line extending to the teeth of the bucket 133 from the bucket pin P3.

The positions of the contour points of the bucket 133 are obtained on the basis of a boom length L1 that is a length of the boom 131, an arm length L2 that is a length of the arm 132, a bucket length L3 that is a length of the bucket 133, the boom angle $\alpha$, the arm angle $\beta$, the bucket angle $\gamma$, shape information of the bucket 133, a position of the representative point O of the swing body 120 in the site coordinate system, and a positional relationship between the representative point O and the boom pin P1. The boom length L1 is a distance from the boom pin P1 to the arm pin P2. The arm length L2 is a distance from the arm pin P2 to the bucket pin P3. The bucket length L3 is a distance from the bucket pin P3 to the teeth of the bucket 133. The positional relationship between the representative point O and the boom pin P1 is represented by, for example, a position of the boom pin P1 in the vehicle body coordinate system.

<<Intervention Control>>

The work equipment control device 126 restricts a speed of the bucket 133 in a direction of approaching a construction object such that the bucket 133 does not advance into a design surface set in a construction site. Hereinafter, the work equipment control device 126 restricting a speed of the bucket 133 will also be referred to as intervention control.

In the intervention control, in a case where a distance between the bucket 133 and the design surface is less than a predetermined distance, the work equipment control device 126 generates a control command for the boom cylinder 134, and outputs the control command to the electromagnetic proportional control valve of the hydraulic device 125 such that the bucket 133 does not advance into the design surface. Consequently, the boom 131 is driven such that a speed of the bucket 133 becomes a speed corresponding to a distance between the bucket 133 and the design surface. In other words, the work equipment control device 126 restricts a speed of the bucket 133 by moving up the boom 131 by using a control command for the boom cylinder 134. Through the intervention control, an operator of the hydraulic excavator 100 operates the arm to simply move the bucket 133 along the design surface and can thus perform leveling work of generating a surface corresponding to a flat design surface by raking and leveling earth contacting with the bucket 133. The leveling work is an example of a predetermined work state.

In other embodiments, in the intervention control, a control command for the arm cylinder 135 or a control command for the bucket cylinder 136 may be output. In other words, in other embodiments, in the intervention control, a speed of the bucket 133 may be restricted by moving up the arm 132, and a speed of the bucket 133 may be directly restricted.

<<Work Equipment Control Device>>

The work equipment control device 126 includes a processor 1261, a main memory 1262, a storage 1263, and an interface 1264.

The storage 1263 stores a program for controlling the work equipment 130. The storage 1263 may be, for example, a hard disk drive (HDD), a solid state drive (SSD), or a nonvolatile memory. The storage 1263 may be an internal medium directly coupled to a bus of the work equipment control device 126 and may be an external medium coupled to the work equipment control device 126 via the interface 1264 or a communication line.

The processor 1261 reads the program from the storage 1263, develops the program on the main memory 1262, and executes a process according to the program. The processor 1261 secures a storage region in the main memory 1262 according to the program. The interface 1264 is coupled to the stroke detector 137, the operation device 1211, the position and azimuth calculator 123, the inclination detector 124, the electromagnetic proportional control valve of the hydraulic device 125, the input-output device 127, and other peripheral devices and performs input and output of signals.

The program may be a program for realizing some functions exhibited by the work equipment control device 126. For example, the program may exhibit a function through a combination with another program stored in the storage 1263 already or a combination with another program installed in another device.

Figure 5:
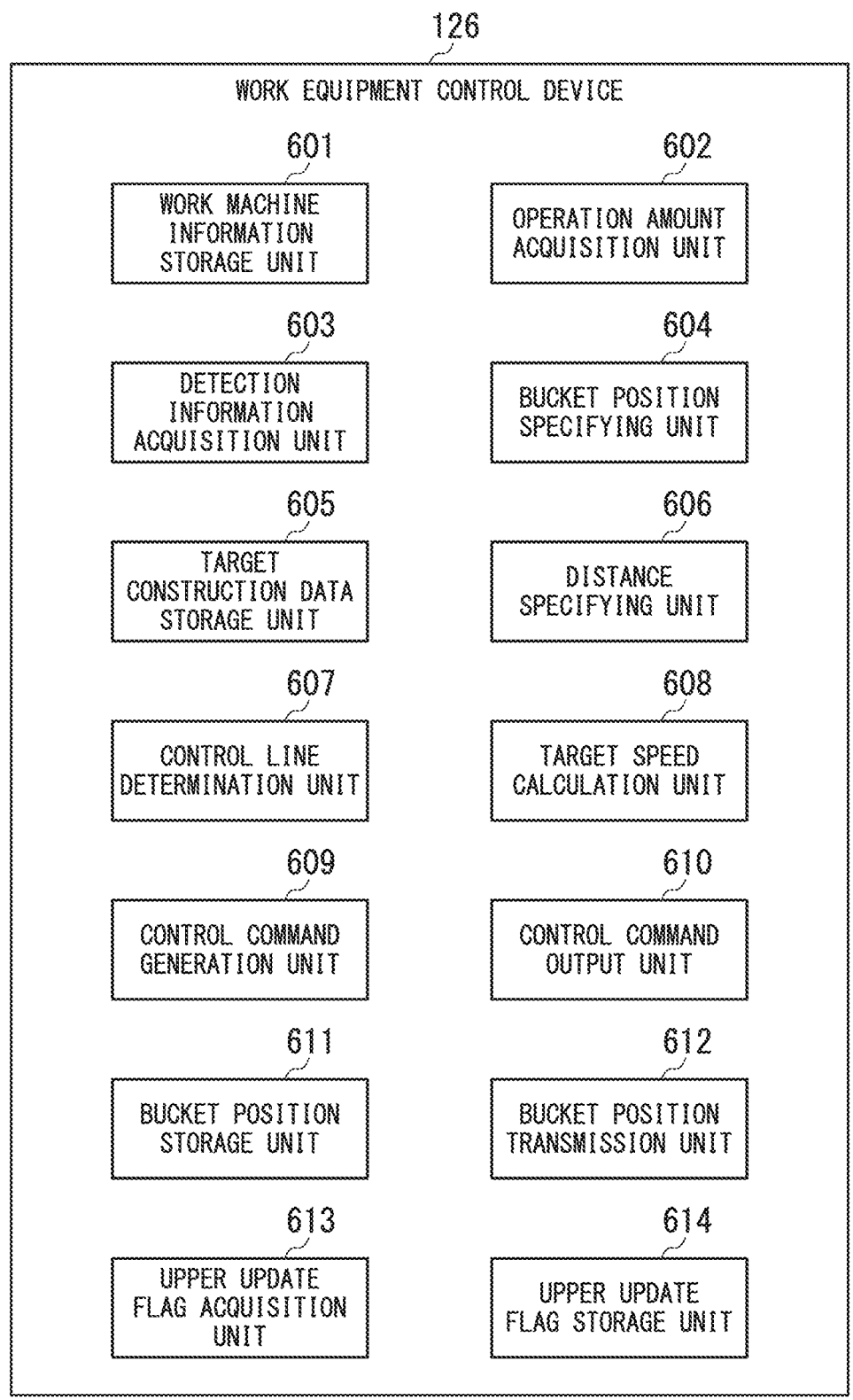
FIG. 5 is a block diagram showing a configuration of a work equipment control device according to the first embodiment.

FIG. 5 is a block diagram showing a configuration of the work equipment control device according to the first embodiment.

The work equipment control device 126 includes a work machine information storage unit 601, an operation amount acquisition unit 602, a detection information acquisition unit 603, a bucket position specifying unit 604, a target construction data storage unit 605, a distance specifying unit 606, a control line determination unit 607, a target speed calculation unit 608, a control command generation unit 609, a control command output unit 610, a bucket position storage unit 611, a bucket position transmission unit 612, an upper update flag acquisition unit 613, and an upper update flag storage unit 614.

The work machine information storage unit 601 stores the boom length L1, the arm length L2, the bucket length L3, positions of the contour points of the bucket 133, and a positional relationship between a position of the representative point O of the swing body 120 and the boom pin P1.

The operation amount acquisition unit 602 acquires an operation signal indicating an operation amount (such as a pilot hydraulic oil or angles of the operation lever 1212 and the operation lever 1213) from the operation device 1211. For example, the operation amount acquisition unit 602 acquires an operation amount related to the boom 131, an operation amount related to the arm 132, an operation amount related to the bucket 133, and an operation amount related to swinging.

The detection information acquisition unit 603 acquires information detected by each of the position and azimuth calculator 123, the inclination detector 124, and the stroke detector 137. For example, the detection information acquisition unit 603 acquires position information of the swing body 120 in the site coordinate system, an azimuth in which the swing body 120 is directed, a pose of the swing body 120, a stroke length of the boom cylinder 134, a stroke length of the arm cylinder 135, and a stroke length of the bucket cylinder 136.

The bucket position specifying unit 604 specifies a position and a pose of the bucket 133 on the basis of information acquired by the detection information acquisition unit 603. In this case, the bucket position specifying unit 604 specifies the bucket terminal angle η. The bucket position specifying unit 604 specifies the bucket terminal angle η according to the following procedures. The bucket position specifying unit 604 calculates the boom angle α on the basis of the stroke length of the boom cylinder 134. The bucket position specifying unit 604 calculates the arm angle β on the basis of the stroke length of the arm cylinder 135. The bucket position specifying unit 604 calculates the bucket angle γ on the basis of the stroke length of the bucket cylinder 136. The bucket position specifying unit 604 calculates the bucket terminal angle η by adding the boom angle α, the arm angle β, and the bucket angle γ together.

The bucket position specifying unit 604 specifies positions of a plurality of contour points of the bucket 133 in the site coordinate system on the basis of the information acquired by the detection information acquisition unit 603 and the information stored in the work machine information storage unit 601. The bucket position specifying unit 604 specifies positions of the contour points of the work equipment 130 in the site coordinate system according to the following procedures. The bucket position specifying unit 604 specifies a position of the arm pin P2 in the vehicle body coordinate system on the basis of the boom angle α acquired by the detection information acquisition unit 603 and the boom length L1 stored in the work machine information storage unit 601. The bucket position specifying unit 604 specifies a position of the bucket pin P3 in the vehicle body coordinate system on the basis of the position of the arm pin P2, the arm angle β acquired by the detection information acquisition unit 603, and the arm length L2 stored in the work machine information storage unit 601. The bucket position specifying unit 604 specifies a position and a pose of the bucket 133 on the basis of the position of the bucket pin P3, the bucket angle γ acquired by the detection information acquisition unit 603, and the bucket length L3 stored in the work machine information storage unit 601. The bucket position specifying unit 604 specifies positions of the contour points of the bucket 133 in the vehicle body coordinate system on the basis of the specified position and pose of the bucket 133 and the shape information of the bucket 133 stored in the work machine information storage unit 601. The bucket position specifying unit 604 converts the positions of the contour points of the bucket 133 in the vehicle body coordinate system into positions in the site coordinate system on the basis of the position information of the swing body 120 in the site coordinate system, acquired by the detection information acquisition unit 603, the azimuth in which the swing body 120 is directed, and the pose of the swing body 120. The positions of the contour points of the bucket 133 obtained in this case are positions of points at the width direction center among the contour points of the bucket 133.

The target construction data storage unit 605 stores target construction data representing a design surface of a construction site. The target construction data is three-dimensional data represented by the site coordinate system and is stereoscopic landform data formed of a plurality of triangular polygons representing the design surface. Each of the triangular polygons forming the target construction data has common sides with other triangular polygons adjacent thereto. In other words, the target construction data represents consecutive planes including a plurality of planes. The target construction data is read from an external storage medium or is received from an external server via the network N, to be stored in the target construction data storage unit 605.

The distance specifying unit 606 specifies a distance between each of a plurality of contour points E of the bucket 133 and the design surface. For example, the distance specifying unit 606 specifies a distance between the contour point E and the design surface according to the following method. In other embodiments, a contour point may be provided at a single location of a predetermined position of the bucket 133. In this case, the distance specifying unit 606 specifies a distance between the contour point and the design surface.

Figure 6:
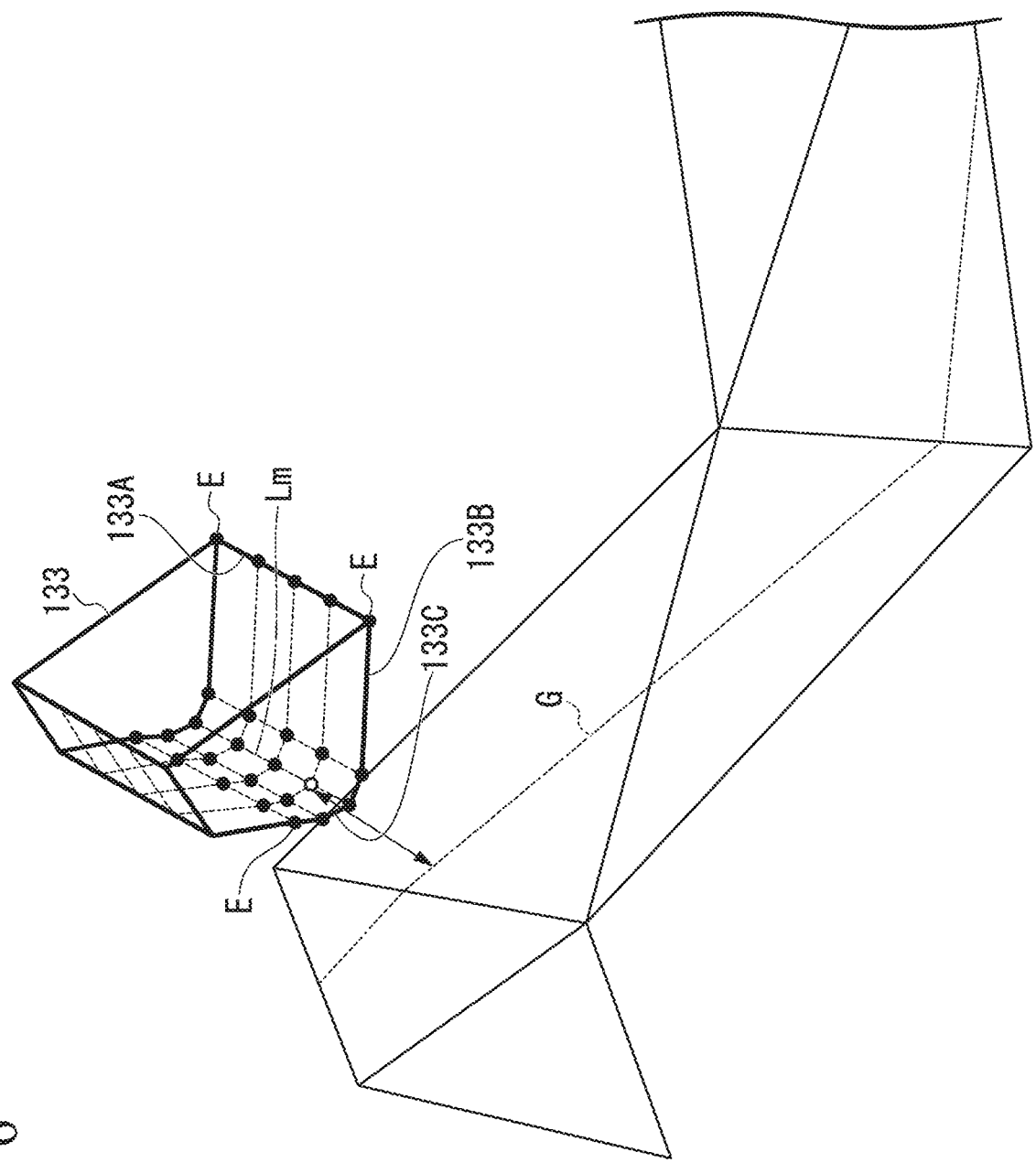
FIG. 6 is a diagram showing a relationship between a plurality of contour points and a design surface of a bucket.

FIG. 6 is a diagram showing a relationship between a plurality of contour points of the bucket and the design surface. The plurality of contour points E according to the first embodiment are intersections between a plurality of transverse lines and longitudinal sections of the bucket 133. The plurality of transverse line of the bucket 133 include a teeth line along which teeth 133A of the bucket 133 are arranged, and a plurality of lines that are parallel to the teeth line and are present in regions such as a bottom surface 133B and a heel portion 133C of the bucket 133. The plurality of longitudinal sections of the bucket 133 include both side surfaces of the bucket 133 and faces that are parallel to both side surfaces and divide a space between both side surfaces.

The distance specifying unit 606 specifies each of intersection lines between the longitudinal sections of the bucket 133 and the design surface. With respect to each longitudinal section, the distance specifying unit 606 obtains a distance between the contour point E on the longitudinal section and the specified intersection line.

The control line determination unit 607 determines a control line G used for intervention control for the bucket 133. The control line determination unit 607 determines, for example, an intersection line between a longitudinal section of the bucket 133 including the contour point E related to the shortest distance specified by the distance specifying unit 606 and the design surface, as the control line G. In other embodiments, a longitudinal section for determining a control line is not limited to a longitudinal section including the contour point E related to the shortest distance, and may be a predefined face such as a longitudinal section passing through the center of the bucket 133 or a face that is manually selected.

The target speed calculation unit 608 determines a boom target speed that is a target speed of the boom 131 using the boom pin P1 as a reference, an arm target speed that is a target speed of the arm 132 using the arm pin P2 as a reference, and a bucket target speed that is a target speed of the bucket 133 using the bucket pin P3 as a reference on the basis of the operation amounts on the operation lever 1212 and the operation lever 1213 acquired by the operation amount acquisition unit 602. Hereinafter, a target speed in a vertical direction of the bucket 133 using the swing body 120 as a reference, represented by a sum of vertical direction components of the boom target speed, the arm target speed, and the bucket target speed, will be referred to as a bucket terminal target speed. A speed of the boom 131 using the boom pin P1 as a reference will be referred to as a boom speed, a speed of the arm 132 using the arm pin P2 as a reference will be referred to as an arm speed, a speed of the bucket 133 using the bucket pin P3 as a reference will be referred to as a bucket speed, and a speed in the vertical direction of the bucket 133 using the swing body 120 as a reference, represented by a sum of vertical direction components of the boom speed, the arm speed, and the bucket speed, will be referred to as a bucket terminal speed. Hereinafter, a speed directed downward in the vertical direction is represented by a positive value, and a speed directed upward in the vertical direction is represented by a negative value.

The control command generation unit 609 performs intervention control for controlling the work equipment 130 such that the bucket 133 does not advance further downward than the control line G, on the basis of the distance specified by the distance specifying unit 606. The control command generation unit 609 detects a speed limit of the boom 131 in the vertical direction to satisfy a speed table indicating a relationship between a distance between the contour point E of the bucket 133 and the control line G, and an allowable upper limit value of a bucket terminal speed at which the bucket 133 approaches the control line G. An example of the speed table may be a table in which an allowable upper limit value of the bucket terminal speed comes closer to 0 as a distance between the contour point E of the bucket 133 and the control line G comes closer to 0. In the present embodiment, the control command generation unit 609 determines a speed limit of the boom 131 in the vertical direction but is not limited thereto, and may determine, for example, a speed limit in a normal direction.

For example, in a case where a bucket terminal target speed obtained by using the vertical direction components of the boom target speed, the arm target speed, and the bucket target speed is more than an allowable upper limit value of the bucket terminal speed in the speed table, the control command generation unit 609 performs intervention control. In a case where the intervention control is performed, the control command generation unit 609 subtracts a sum of the vertical direction components of the arm target speed and the bucket target speed from an upper limit value of the bucket target speed so as to calculate a speed limit of the boom 131 in the vertical direction. The control command generation unit 609 determines a boom speed by using the speed limit of the boom 131 in the vertical direction.

On the other hand, in a case where the bucket terminal target speed is equal to or less than the allowable upper limit value of the bucket terminal speed in the speed table, the control command generation unit 609 does not performed the intervention control. In a case where the intervention control is not performed, the control command generation unit 609 generates control commands for the boom 131, the arm 132, and the bucket 133 on the basis of the boom target speed, the arm target speed, and the bucket target speed.

The control command output unit 610 outputs the control command for the boom 131, the control command for the arm 132, and the control command for the bucket 133, generated by the control command generation unit 609, to the electromagnetic proportional control valve of the hydraulic device 125.

The bucket position storage unit 611 stores the positions of the plurality of contour points E of the bucket 133 in the site coordinate system, specified by the bucket position specifying unit 604, an intervention flag indicating the presence or absence of intervention control of the control command generation unit 609, and an upper update flag indicating whether or not current status landform data is permitted to be updated to an upper value (a value greater than the current value of Zg) during leveling work to be associated with time. In a case where the intervention control is performed by the control command generation unit 609, the intervention flag is turned on. In a case where the intervention control is not performed by the control command generation unit 609, the intervention flag is turned off. In a case where the upper update flag is turned on, current status landform data is permitted to be updated to an upper value during leveling work. In a case where the upper update flag is turned off, current status landform data is not permitted to be updated to an upper value during leveling work. Here, a height in the current status landform data being updated to an upper value indicates that a value Zg1 of a height at any plane position (Xg1, Yg1) in the current status landform data is updated to a value Zg1' greater than Zg1, that is, current status landform data Xg1, Yg1, and Zg1 at the point is updated to Xg1, Yg1, and Zg1'.

The bucket position transmission unit 612 the information stored in the bucket position storage unit 611 to the construction management device 200.

The upper update flag acquisition unit 613 receives input of whether or not current status landform data is permitted to be updated to an upper value during leveling work in the construction management device 200 from an operator of the hydraulic excavator 100 via the input-output device 127. The upper update flag acquisition unit 613 updates the upper update flag stored in the upper update flag storage unit 614 on the basis of the input information.

<<Operation of Work Equipment Control Device>>

Hereinafter, a description will be made of a control method for the hydraulic excavator 100 according to the first embodiment.

Figure 7:
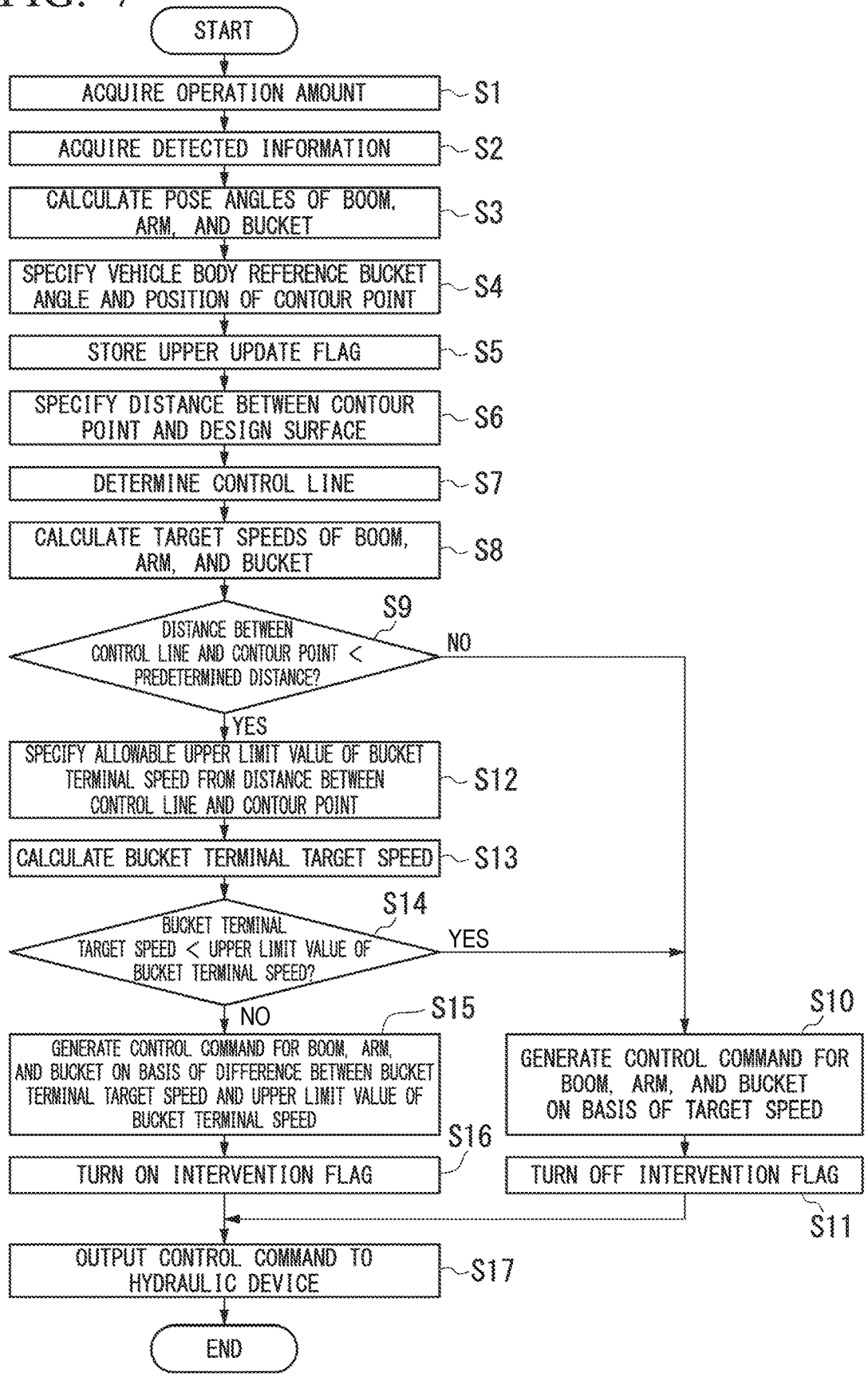
FIG. 7 is a flowchart showing an operation of the work equipment control device according to the first embodiment.

FIG. 7 is a flowchart showing an operation of the work equipment control device according to the first embodiment. The work equipment control device 126 performs control described below every predetermined control cycle.

The operation amount acquisition unit 602 acquires, from the operation device 1211, an operation amount related to the boom 131, an operation amount related to the arm 132, an operation amount related to the bucket 133, and an operation amount related to swinging (step S1). The detection information acquisition unit 603 acquires information detected by each of the position and azimuth calculator 123, the inclination detector 124, and the stroke detector 137 (step S2).

The bucket position specifying unit 604 calculates the boom angle α, the arm angle β, and the bucket angle γ on the basis of stroke lengths of the respective hydraulic cylinders (step S3). The bucket position specifying unit 604 calculates the bucket terminal angle and positions of a plurality of contour points E of the bucket 133 in the site coordinate system on the basis of the calculated pin reference pose angles α, β, and γ, the boom length L1, the arm length L2, the bucket length L3, and shape information of the bucket 133 stored in the work machine information storage unit 601, and a position, an azimuth, and a pose of the swing body 120 acquired by the detection information acquisition unit 603 (step S4). The bucket position specifying unit 604 stores the positions of the plurality of contour points E of the bucket 133 into the bucket position storage unit 611 in association with the current time. In this case, the upper update flag acquisition unit 613 stores the upper update flag stored in the upper update flag storage unit 614 into the bucket position storage unit 611 in association with the current time (step S5). In other words, the control command generation unit 609 records the upper update flag indicating ON into the bucket position storage unit 611 in a case where the upper update flag stored in the upper update flag storage unit 614 indicates ON, and records the upper update flag indicating OFF into the bucket position storage unit 611 in a case where the upper update flag stored in the upper update flag storage unit 614 indicates OFF.

The distance specifying unit 606 specifies a distance between each of the plurality of contour points E and a design surface represented by target construction data stored in the target construction data storage unit 605 (step S6). The control line determination unit 607 determines a control line G on the basis of the distance specified by the distance specifying unit 606 (step S7).

The target speed calculation unit 608 calculates a boom target speed, an arm target speed, and a bucket target speed on the basis of the operation amounts acquired by the operation amount acquisition unit 602 in step S1 (step S8).

The control command generation unit 609 determines whether or not, among the distances specified by the distance specifying unit 606, the shortest distance is less than a predetermined distance (step S9). In a case where a distance between the control line G and the contour point E of the bucket 133 is equal to or more than a predetermined distance (step S9: NO), the control command generation unit 609 does not perform intervention control. In a case where the intervention control is not performed, the control command generation unit 609 generates control commands for the boom 131, the arm 132, and the bucket 133 on the basis of the boom target speed, the arm target speed, and the bucket target speed (step S10). In this case, the control command generation unit 609 stores an intervention flag indicating that the intervention control is not performed into the bucket position storage unit 611 in association with the current time (step S11). In other words, the control command generation unit 609 turns off the intervention flag.

On the other hand, in a case where a distance between the control line G and the contour point E of the bucket 133 is less than the predetermined distance (step S9: YES), the control command generation unit 609 performs the intervention control. In a case where the intervention control is performed, the control command generation unit 609 specifies an allowable upper limit value of a bucket terminal speed on the basis of the distance specified by the distance specifying unit 606 and the above-described speed table stored in the work machine information storage unit 601 (step S12). Next, the control command generation unit 609 calculates a bucket terminal target speed on the basis of vertical direction components of the boom target speed, the arm target speed, and the bucket target speed calculated in step S8 (step S13). Next, the control command generation unit 609 determines whether or not the bucket terminal target speed calculated in step S13 is less than the allowable upper limit value of the bucket terminal speed specified in step S12 (step S14).

In a case where the bucket terminal target speed is less than the allowable upper limit value of the bucket terminal speed (step S14: YES), the control command generation unit 609 generates control commands for the boom 131, the arm 132, and the bucket 133 on the basis of the boom target speed, the arm target speed, and the bucket target speed (step S10). On the other hand, in a case where the bucket terminal target speed is equal to or more than the allowable upper limit value of the bucket terminal speed (step S14: NO), the control command generation unit 609 generates control commands for the boom 131, the arm 132, and the bucket 133 on the basis of a difference between the bucket terminal target speed and the bucket terminal speed (step S15). In this case, the control command generation unit 609 stores an intervention flag indicating that the intervention control is performed into the bucket position storage unit 611 in association with the current time (step S16). In other words, the control command generation unit 609 turns on the intervention flag.

In a case where the control command generation unit 609 generates the control commands for the boom 131, the arm 132, and the bucket 133, the control command output unit 610 outputs the control commands to the electromagnetic proportional control valve of the hydraulic device 125 (step S17). Consequently, the hydraulic device 125 drives the boom cylinder 134, the arm cylinder 135, and the bucket cylinder 136.

The process is repeatedly performed, and thus positions of the plurality of contour points E in the site coordinate system, the intervention flag, and the upper update flag are stored in a time series into the bucket position storage unit 611 of the work equipment control device 126. The bucket position transmission unit 612 transmits the information stored in the bucket position storage unit 611 to the construction management device 200 via the network N at a predetermined timing.

<<Configuration of Construction Management Device>>

Figure 8:
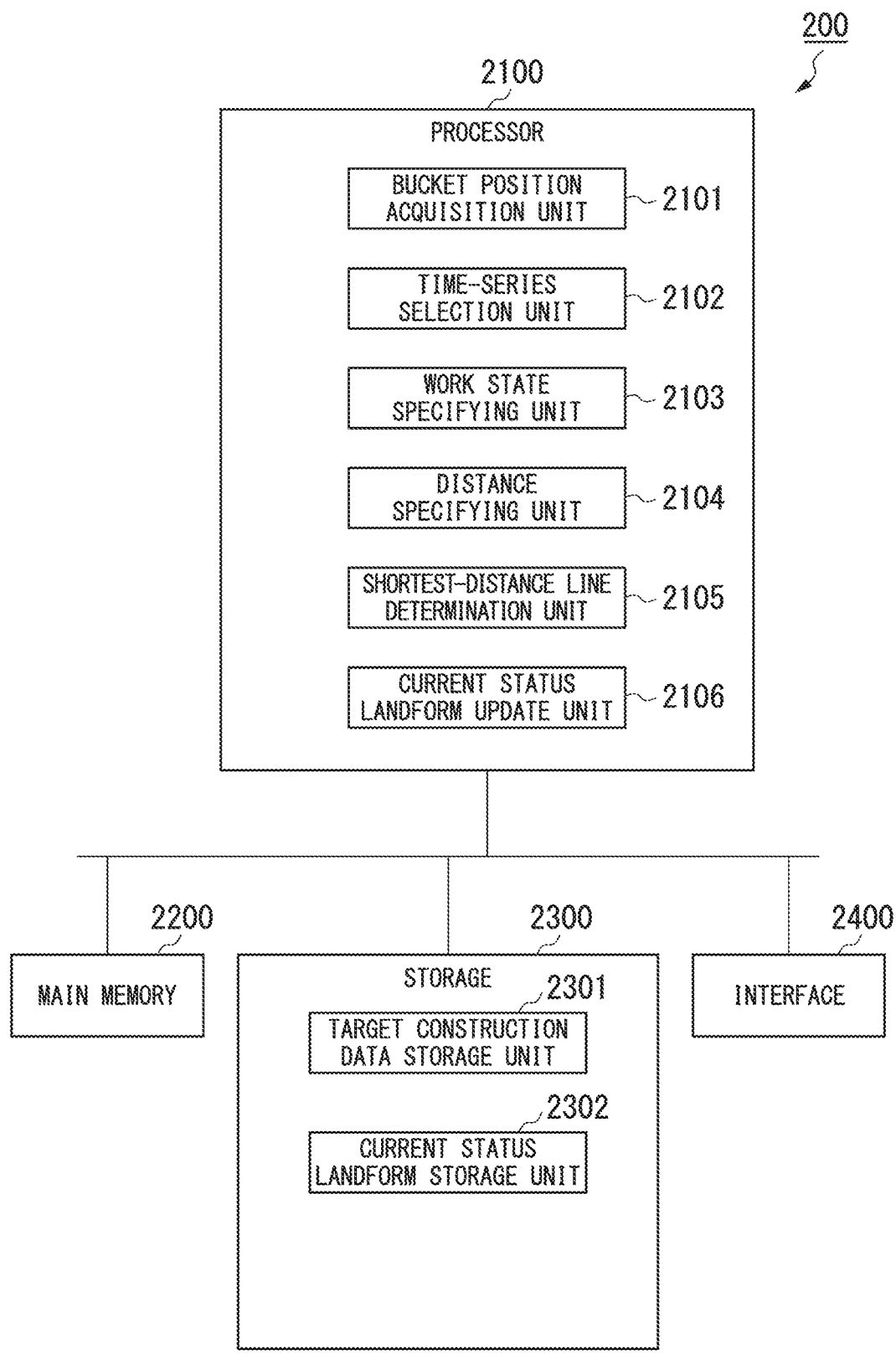
FIG. 8 is a schematic block diagram showing a configuration of a construction management device according to the first embodiment.

FIG. 8 is a schematic block diagram showing a configuration of the construction management device according to the first embodiment.

The construction management device 200 is a computer including a processor 2100, a main memory 2200, a storage 2300, and an interface 2400. The storage 2300 stores a program. The processor 2100 reads the program from the storage 2300, develops the program on the main memory 2200, and executes a process according to the program. The construction management device 200 is coupled to the interface 2400 via the network N. The construction management device 200 is coupled to an input-output device (not shown) via the interface 2400.

The storage 2300 may be, for example, a hard disk drive (HDD), a solid state drive (SSD), or a nonvolatile memory. The storage 2300 may be an internal medium directly coupled to a bus of the construction management device 200, and may be an external medium coupled to the construction management device 200 via the interface 2400. The storage 2300 is a non-transitory storage medium.

The storage 2300 has storage regions as a target construction data storage unit 2301 and a current status landform storage unit 2302.

The target construction data storage unit 2301 stores target construction data representing a design surface of a construction site in the same manner as the target construction data storage unit 605. The target construction data is, for example, data regarding the site coordinate system.

The current status landform storage unit 2302 stores current status landform data that is three-dimensional data representing a landform of a construction site. The current status landform data may be, for example, point group data representing a current status landform of a construction site by using a set of points representing heights ($Z_g$) on respective grids dividing a horizontal plane ($X_g$-$Y_g$ plane) in the site coordinate system. The current status landform data may be updated to the latest data on the basis of a predetermined condition.

The processor 2100 executes the program, and thus functions as a bucket position acquisition unit 2101, a time-series selection unit 2102, a work state specifying unit 2103, a distance specifying unit 2104, a shortest-distance line determination unit 2105, and a current status landform update unit 2106.

The bucket position acquisition unit 2101 acquires a time series of positions of a plurality of contour points E of the bucket 133 in the site coordinate system, a time series of an intervention flag, and a time series of an upper update flag from the work equipment control device 126.

The time-series selection unit 2102 selects a time point at which the time series of positions of a plurality of contour points E, the time series of an intervention flag, and the time series of an upper update flag acquired by the bucket position acquisition unit 2101 are used as processing objects one by one in an order of earlier time series.

The work state specifying unit 2103 determines whether or not a work state of the work equipment 130 is a leveling work state on the basis of the intervention flag related to the time point selected by the time-series selection unit 2102 among the time series acquired by the bucket position acquisition unit 2101. In other words, in a case where the intervention flag indicates that the intervention control is performed, the work state specifying unit 2103 determines that a work state is a leveling work state.

The distance specifying unit 2104 specifies a distance between each of the plurality of contour points E of the bucket 133 and the design surface in the same manner as the distance specifying unit 606 of the work equipment control device 126. In other words, the distance specifying unit 2104 specifies each of intersection lines between the longitudinal sections of the bucket 133 and the design surface, and, with respect to each longitudinal section, obtains a distance between the contour point E on the longitudinal section and the specified intersection line.

The shortest-distance line determination unit 2105 determines a bucket width direction line passing through the contour point E related to the shortest distance among the distances between the respective contour points and the design surface specified by the distance specifying unit 2104, as a shortest-distance line Lm used to update the current status landform data. The bucket width direction line passing through the contour point E is a line segment extending in a width direction of the bucket 133 through the contour point E and having the same length as a width of the bucket 133.

In a case where the work state is specified not to be a leveling work state by the work state specifying unit 2103, the current status landform update unit 2106 updates a value of a height in current status landform data related to a plane position corresponding to a position of the bucket 133 among pieces of current status landform data stored in the current status landform storage unit 2302, to a smaller height of a height of the contour point E of the shortest-distance line Lm and the height in the current status landform data. In other words, in a case where the work state is not a leveling work state, and a height of the lowest point of the bucket 133 is equal to or less than the height in the current status landform data, the current status landform update unit 2106 updates the height in the current status landform data to the lowest-point height of the bucket 133. A method of updating current status landform data on the basis of the current status landform data and the lowest point of the bucket 133 is referred to as lowest-point update. On the other hand, in a case where the work state is not a leveling work state and the lowest-point height of the bucket 133 is larger than the height in the current status landform data, the current status landform update unit 2106 does not update the current status landform data.

In a case where the work state is specified to be a leveling work state by the work state specifying unit 2103, the current status landform update unit 2106 updates the current status landform data stored in the current status landform storage unit 2302 to the height of the shortest-distance line Lm regardless of a positional relationship between the shortest-distance line Lm and the current status landform data. In other words, in a case where the work state is a leveling work state, the current status landform update unit 2106 updates the current status landform data to an upper value when the height of the shortest-distance line Lm is larger than the height in the current status landform data. A method in which the current status landform data is updated to an upper value by using the position of the shortest-distance line Lm is referred to as upper update. A method in which the current status landform data is updated to an upper value according to the position of the shortest-distance line Lm regardless of the height of the current status landform data is referred to as normal update.

The current status landform update unit 2106 performs upper update in a case of satisfying an upper update permission condition that the upper update flag and the intervention flag are in an ON state and performs lowest-point update in a case where the upper update permission condition is not satisfied.

As described above, the operator of the hydraulic excavator 100 may set in advance the upper update flag indicating whether or not the current status landform data is permitted to be updated to an upper value during a leveling work. The upper update flag is acquired in a time series by the bucket position acquisition unit 2101.

<<Operation of Construction Management Device>>

Hereinafter, a description will be made of an operation method of the construction management device 200 according to the first embodiment.

Figure 9:
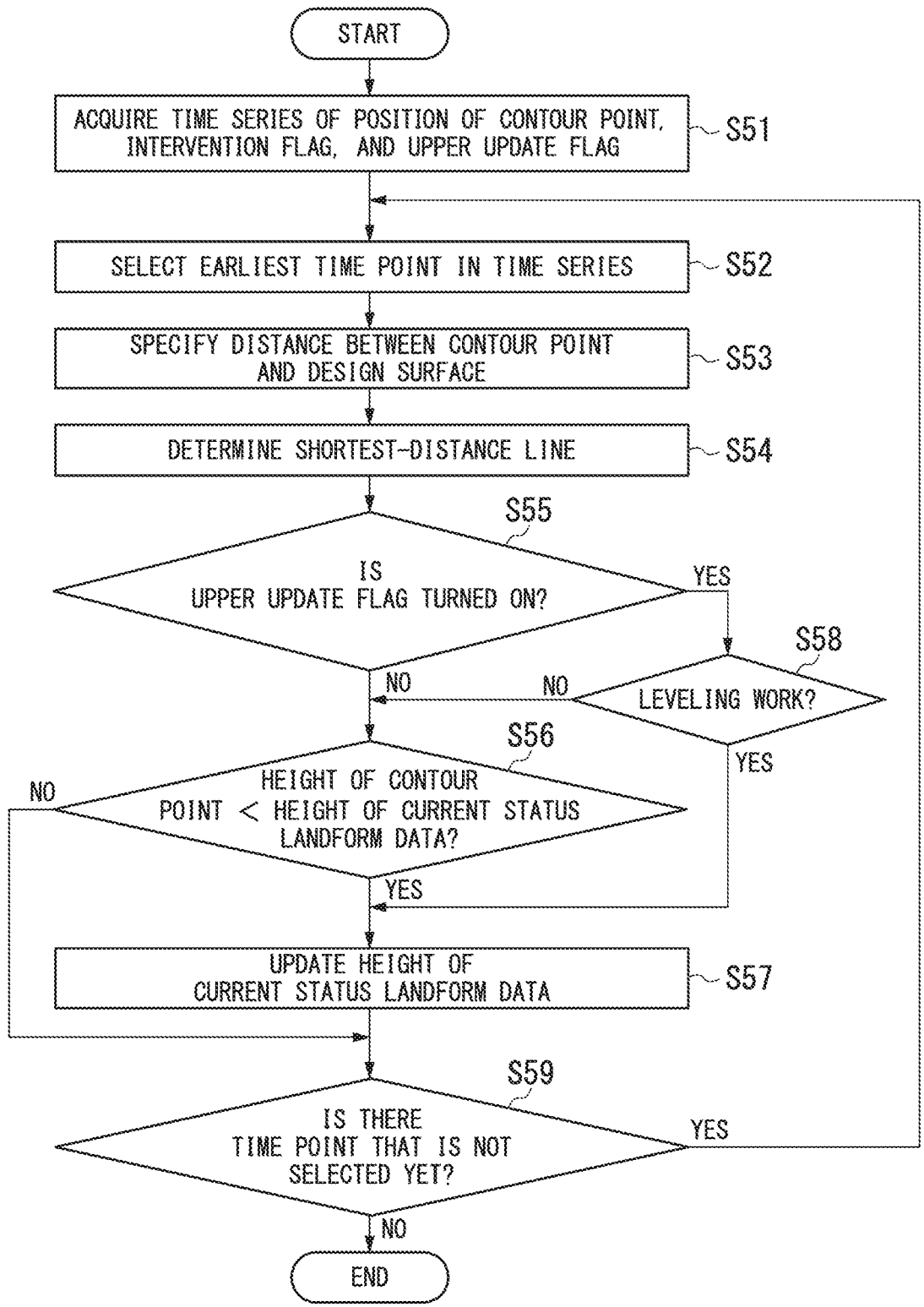
FIG. 9 is a flowchart showing an operation of the construction management device according to the first embodiment.

FIG. 9 is a flowchart showing an operation of the construction management device according to the first embodiment.

The bucket position acquisition unit 2101 of the construction management device 200 acquires a time series of positions of a plurality of contour points E of the bucket 133 in the site coordinate system, a time series of an intervention flag, and a time series of an upper update flag from the work equipment control device 126 of the hydraulic excavator 100 (step S51).

The time-series selection unit 2102 selects a single time point that is earliest in the time series of the positions of the contour points E, the intervention flag, and the upper update flag, and is not selected yet (step S52).

The distance specifying unit 2104 specifies a distance between each of the positions of the plurality of contour points E related to the selected time point and the design surface (step S53). Next, the shortest-distance line determination unit 2105 specifies the shortest-distance line Lm passing through the contour point E having the shortest distance to the design surface (step S54).

The current status landform update unit 2106 determines whether or not the upper update flag related to the selected time point is turned on (step S55). In a case where the upper update flag is turned off (step S55: NO), with respect to a plurality of contour points E on the shortest-distance line Lm, the current status landform update unit 2106 compares a height of current status landform data of a point having the same plane position as that of the contour point E with a height of the contour point E, and thus determines whether or not the height of the contour point E is less than the height in the current status landform data (step S56). Here, the "plane position" is a plane position in a plan view from the top.

In a case where the height of the contour point E is less than the height in the current status landform data (step S56: YES), the current status landform update unit 2106 updates the height in the current status landform data of the point having the same plane position as that of the contour point E to the height of the contour point E (step S57). In other words, the current status landform update unit 2106 updates the current status landform data on the basis of the height of the lowest point of the bucket 133. On the other hand, in a case where the height of the contour point E is equal to or more than the height in the current status landform data (step S56: NO), the height in the current status landform data is not updated.

On the other hand, in a case where the upper update flag is turned on (step S55: YES), the work state specifying unit 2103 determines whether or not a work state of the work equipment 130 is a leveling work state on the basis of the intervention flag related to the selected time point (step S58). In a case where the work state of the work equipment 130 is not a leveling work state (step S58: NO), the current status landform update unit 2106 updates the height in the target construction data in a case where the height of the contour point E is less than the height in the current status landform data through step S56 and step S57.

On the other hand, in a case where the work state of the work equipment 130 is a leveling work state (step S58: YES), the current status landform update unit 2106 causes the process to proceed to step S57, and updates the height in the current status landform data to the height of the contour point E regardless of whether or not the height of the contour point E is less than the height in the current status landform data. In other words, the current status landform update unit 2106 normally updates the current status landform data on the basis of the latest position of the bucket 133.

Next, the time-series selection unit 2102 determines whether or not there is a time point that is not selected yet in the time series acquired in step S51 (step S59). In a case where there is a time point not selected (step S59: YES), the time-series selection unit 2102 returns the process to step S52 and selects the next time point.

On the other hand, in a case where there is no time point not selected (step S59: NO), the construction management device 200 finishes the process of updating current status landform data.

Advantageous Effects

Figure 10:
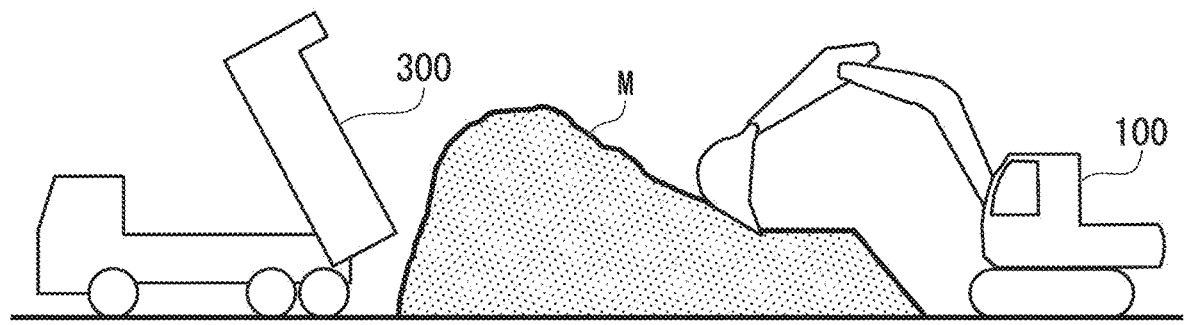
FIG. 10 is a diagram showing an example of banking work.

FIG. 10 is a diagram showing an example of banking work.

For example, in a case where a construction site is flat in expressway construction, it is necessary to perform banking work to form a bank. A dump truck 300 transports earth required to form a bank and discharges the earth to the construction site. Consequently, a pile M of earth is formed on the construction site. The hydraulic excavator 100 cuts the pile M of earth with the bucket 133, and thus forms a bank through leveling work. In this case, a current status landform after construction is started is heightened than before the construction.

Figure 11:
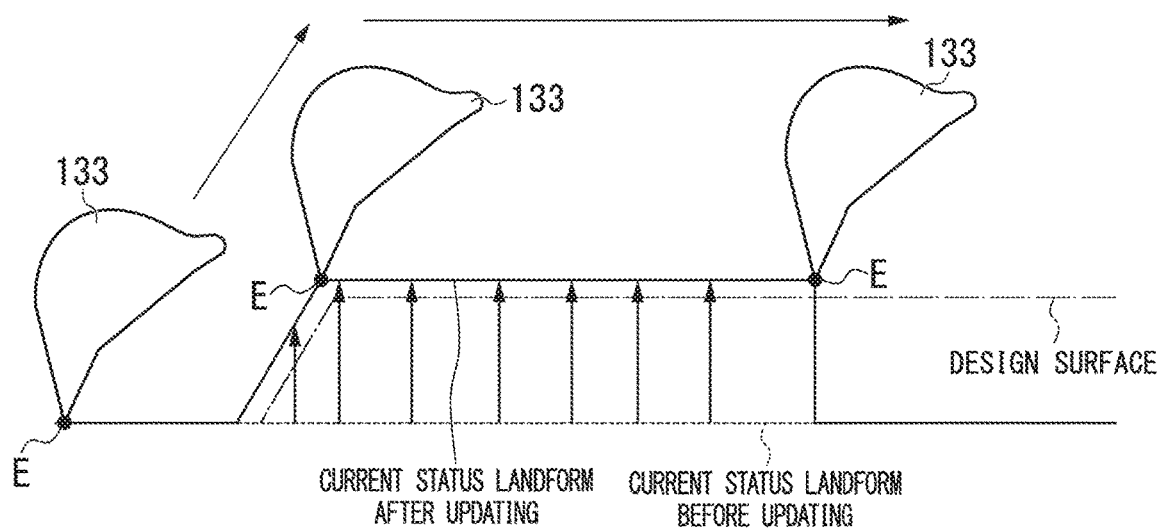
FIG. 11 is a diagram showing an example of a process of updating current status landform data in the construction management device according to the first embodiment.

FIG. 11 is a diagram showing an example of a process of updating current status landform data in the construction management device according to the first embodiment.

In a case where a height in current status landform data is permitted to be updated to an upper value during leveling work, and a work state is a leveling work state, as shown in FIG. 10, the current status landform data is updated to a height of the contour point E closest to the design surface. In other words, according to the first embodiment, in a case where a work state is a leveling work state, the construction management device 200 updates a height in the current status landform data at a plane position corresponding to a position of the bucket 133 to an upper value on the basis of a height where the contour point E of the bucket 133 passes. Consequently, the construction management device 200 can update current status landform data to reflect a current status landform in an actual site during banking work using the hydraulic excavator 100. In this case, a height in the current status landform data is not updated to an upper side with respect to a region where the bucket 133 does not pass. In this case, the input-output device 127 may display a diagram representing a current status landform shown in FIG. 11. In other words, in a case where a work state of the work equipment 130 is a predetermined work state, the input-output device 127 functions as a display device having a display unit (not shown) that displays a line representing a height of a current status landform to be updated an upper position on the basis of a height of the bucket 133. FIG. 11 shows an example of a screen displayed on the display unit of the input-output device 127. At least an image in which the bucket 133 is viewed from the side, a line indicating the design surface, and a line indicating a current status landform, from the viewpoint in which the hydraulic excavator 100 is viewed from the side, are displayed on the display unit.

The hydraulic excavator 100 according to the first embodiment has an intervention control function for decelerating the work equipment 130 on the basis of a distance between a design surface and the bucket 133 in a case where the distance between the design surface and the bucket 133 is less than a predetermined distance. The construction management device 200 determines that a work state is a leveling work state when the work equipment 130 is subjected to intervention control. Consequently, the construction management device 200 can automatically determine a work state regardless of input from an operator or the like.

The construction management device 200 according to the first embodiment updates a height in current status landform data on the basis of a point closest to a design surface among a plurality of contour points E of the bucket 133. Consequently, the construction management device 200 can appropriately update a height in current status landform data even in a case where leveling work is performed at the teeth of the bucket 133 or even in a case where the leveling work is performed at the bottom surface of the bucket 133.

The construction management device 200 according to the first embodiment acquires a position of the bucket 133 from the hydraulic excavator 100 and performs lowest-point update of updating a height in current status landform data to a lowest point or upper update of updating the height in the current status landform data to an upper side on the basis of the position of the bucket 133. The construction management device 200 performs the upper update in a case where an upper update permission condition that an upper update flag and an intervention flag are turned on is satisfied and performs the lowest-point update in a case where the upper update permission condition is not satisfied. Consequently, the construction management device 200 can update current status landform data to an upper value during banking work using a work machine.

Second Embodiment

Next, a description will be made of a second embodiment. The construction management device 200 according to the first embodiment determines that leveling work is performed when intervention control is performed and permits current status landform data to be updated to an upper value. In this case, in a case where an operator of the hydraulic excavator 100 moves up the bucket 133 when the leveling work is finished, the current status landform data may be updated to an upper value due to the movement. The construction management device 200 according to the second embodiment does not update current status landform data even though the bucket 133 is moved up when leveling work is finished.

<<Configuration of Construction Management Device>>

The construction management device 200 according to the second embodiment has the same configuration as that in the first embodiment, and is different from the construction management device of the first embodiment in terms of operations of the time-series selection unit 2102 and the current status landform update unit 2106.

In a case where work related to a selected time point is leveling work, the time-series selection unit 2102 specifies a time period related to leveling work after the time point from the time series acquired in step S51. In other words, the time-series selection unit 2102 specifies a time period from starting of a series of leveling work to finishing thereof from the time series.

The current status landform update unit 2106 specifies a height of a lowest point at each plane position on the basis of positions of a plurality of contour points E related to respective time points in the time period specified by the time-series selection unit 2102, and thus updates a current status landform. In other words, in a case where there are a plurality of time points where the contour point E is present at a predetermined plane position in the time period, the current status landform update unit 2106 determines that a height of the contour point E that is a lowest point among heights of the contour point E at the respective time points is a lowest-point height, and updates a height of a current status landform at the plane position.

<<Operation of Construction Management Device>>

Hereinafter, a description will be made of an operation method of the construction management device 200 according to the second embodiment.

Figure 12:
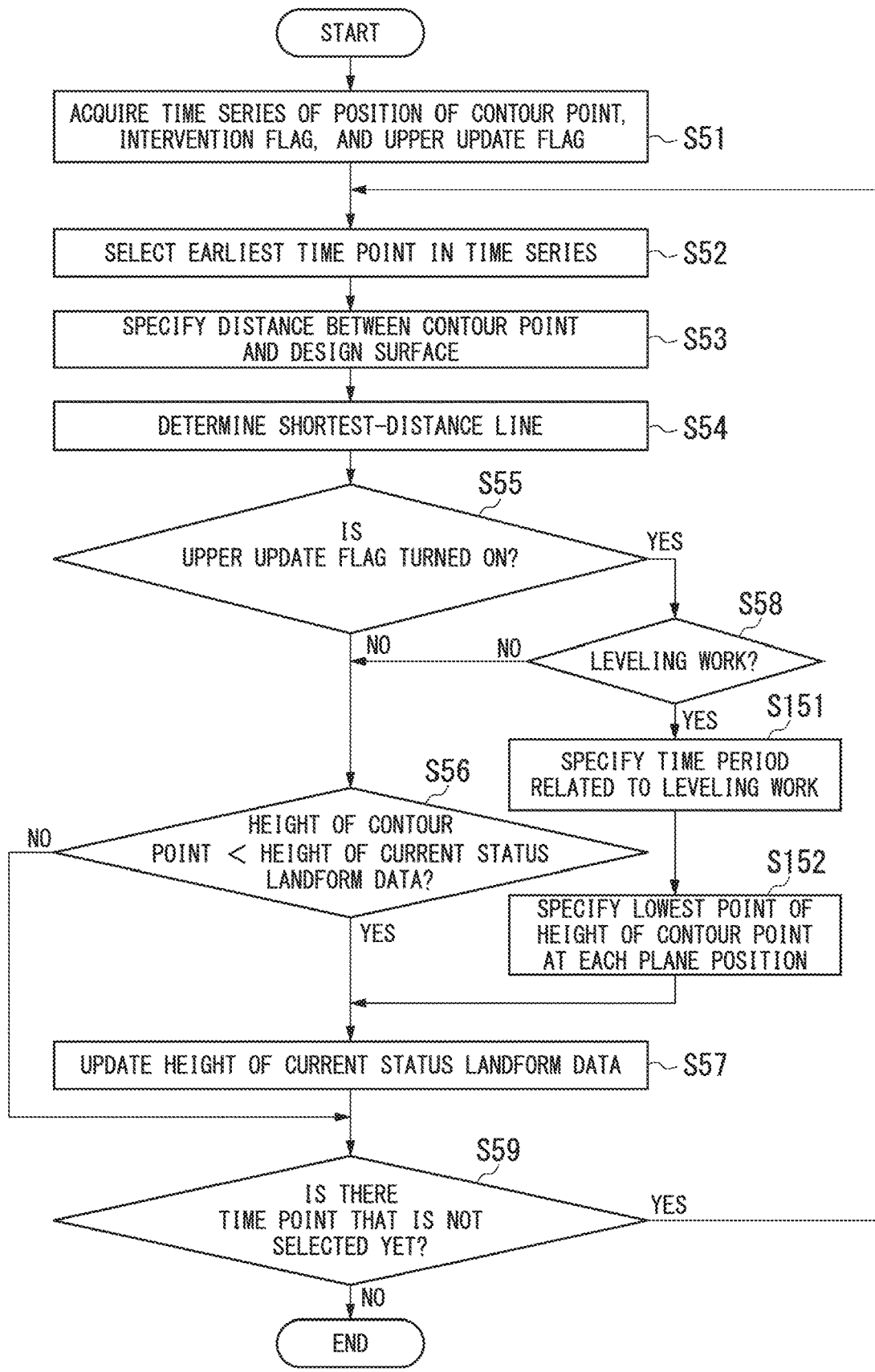
FIG. 12 is a flowchart showing an operation of a construction management device according to a second embodiment.

FIG. 12 is a flowchart showing an operation of the construction management device according to the second embodiment.

The construction management device 200 according to the second embodiment executes processes in step S51 to step S55 in the same manner as in the first embodiment. The construction management device 200 according to the second embodiment executes processes in step S56 to step S59 in the same manner as in the first embodiment in a case where the current status landform data is not allowed to be updated to an upper value during leveling work in step S55 (step S55: NO), and the work state of the work equipment 130 is not a leveling work state (step S58: NO).

On the other hand, in a case where the work state of the work equipment 130 is a leveling work state (step S58: YES), the time-series selection unit 2102 specifies a time period related to the leveling work state after the time point selected in step S52 (step S151). Next, the current status landform update unit 2106 specifies a height of a lowest point at each plane position on the basis of positions of a plurality of contour points E related to respective time points in the specified time period (step S152).

The current status landform update unit 2106 updates a height in the current status landform data at the same plane position as each lowest point to a height of each lowest point (step S57).

Advantageous Effects

Figure 13:
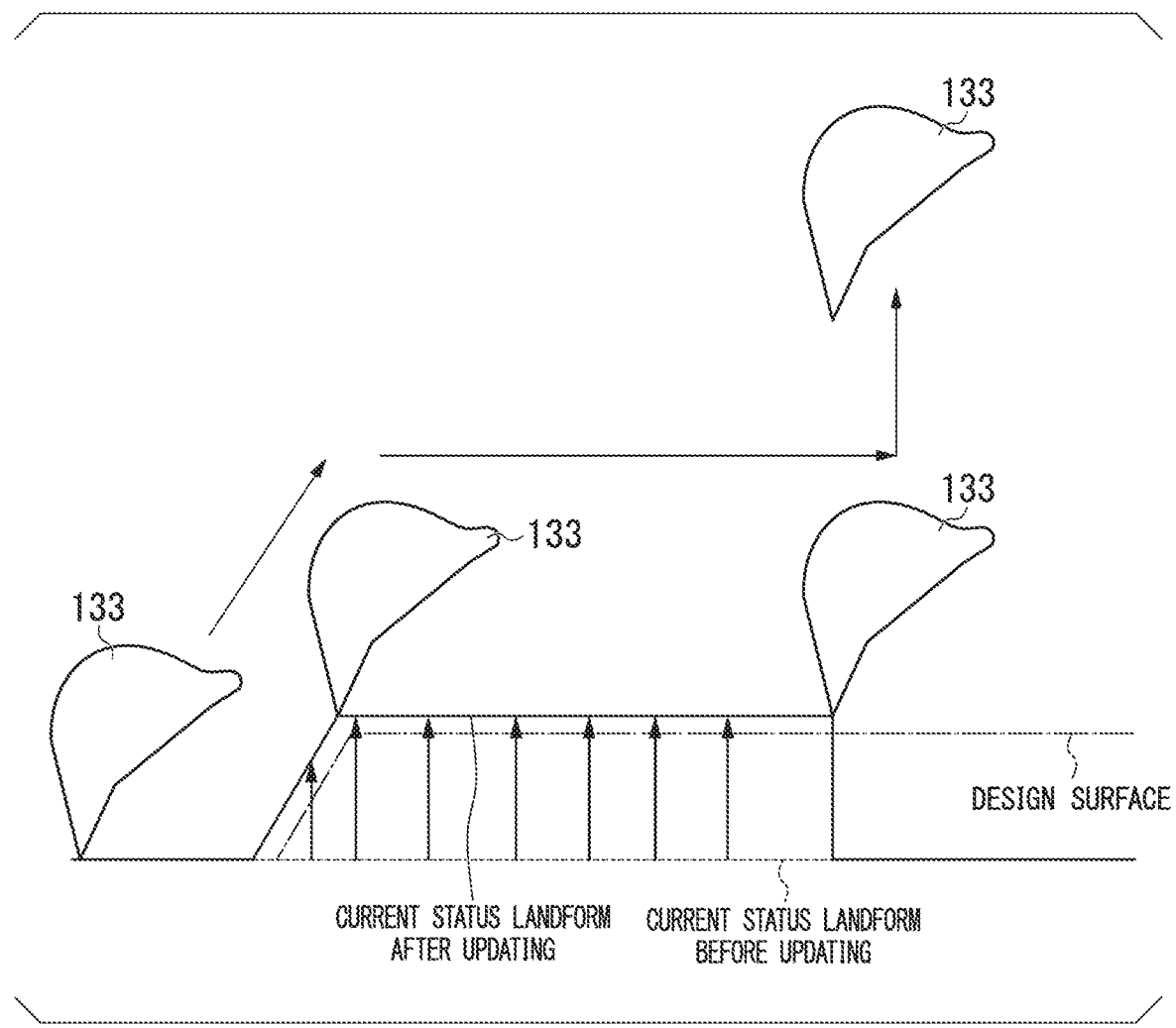
FIG. 13 is a diagram showing an example of a process of updating current status landform data in a construction management device according to the second embodiment.

FIG. 13 is a diagram showing an example of a process of updating current status landform data in the construction management device according to the second embodiment.

In a case where current status landform data is permitted to be updated to an upper value during leveling work, and a work state is a leveling work state, as shown in FIG. 13, update to a height of a lowest point of the contour point E in a time period related to the leveling work state is performed. For example, as shown in FIG. 13, in a case where the bucket 133 is moved up after leveling work is finished, a height of the bucket 133 at a plane position is more than a height of the bucket 133 when actual leveling work is performed. Therefore, in the second embodiment, movement of the bucket 133 after leveling work is finished is not used to update current status landform data. In other words, the construction management device 200 according to the second embodiment can prevent current status landform data from being wrongly updated in a case where the bucket 133 is moved up when leveling work is finished.

Third Embodiment

Next, a third embodiment will be described. The construction management device 200 according to the third embodiment prevents current status landform data from being wrongly updated even in a case where the bucket 133 is moved up when leveling work is finished in a method different from that in the second embodiment.

<<Configuration of Construction Management Device>>

The construction management device 200 according to the third embodiment has the same configuration as that in the first embodiment, and is different from the construction management device of the first embodiment in terms of operations of the bucket position acquisition unit 2101, the work state specifying unit 2103, and the current status landform update unit 2106.

The bucket position acquisition unit 2101 further acquires a time series of an operation amount on the work equipment 130 from the work equipment control device 126 of the hydraulic excavator 100. In other words, the operation amount acquisition unit 602 of the work equipment control device 126 according to the third embodiment stores operation amounts on the boom 131, the arm 132, and the bucket 133 into the bucket position storage unit 611 in association with time points, and the bucket position transmission unit 612 transmits the operation amounts on the boom 131, the arm 132, and the bucket 133 in addition to positions of a plurality of contour points E, an intervention flag, and an upper update flag. In other words, the bucket position acquisition unit 2101 is an example of an operation signal acquisition unit acquiring an operation signal for an operation lever used to operate the work equipment 130.

The work state specifying unit 2103 determines whether or not the bucket 133 is moved up on the basis of the operation amounts on the boom 131, the arm 132, and the bucket 133 acquired by the bucket position acquisition unit 2101.

<<Operation of Construction Management Device>>

Hereinafter, a description will be made of an operation method of the construction management device 200 according to the third embodiment.

Figure 14:
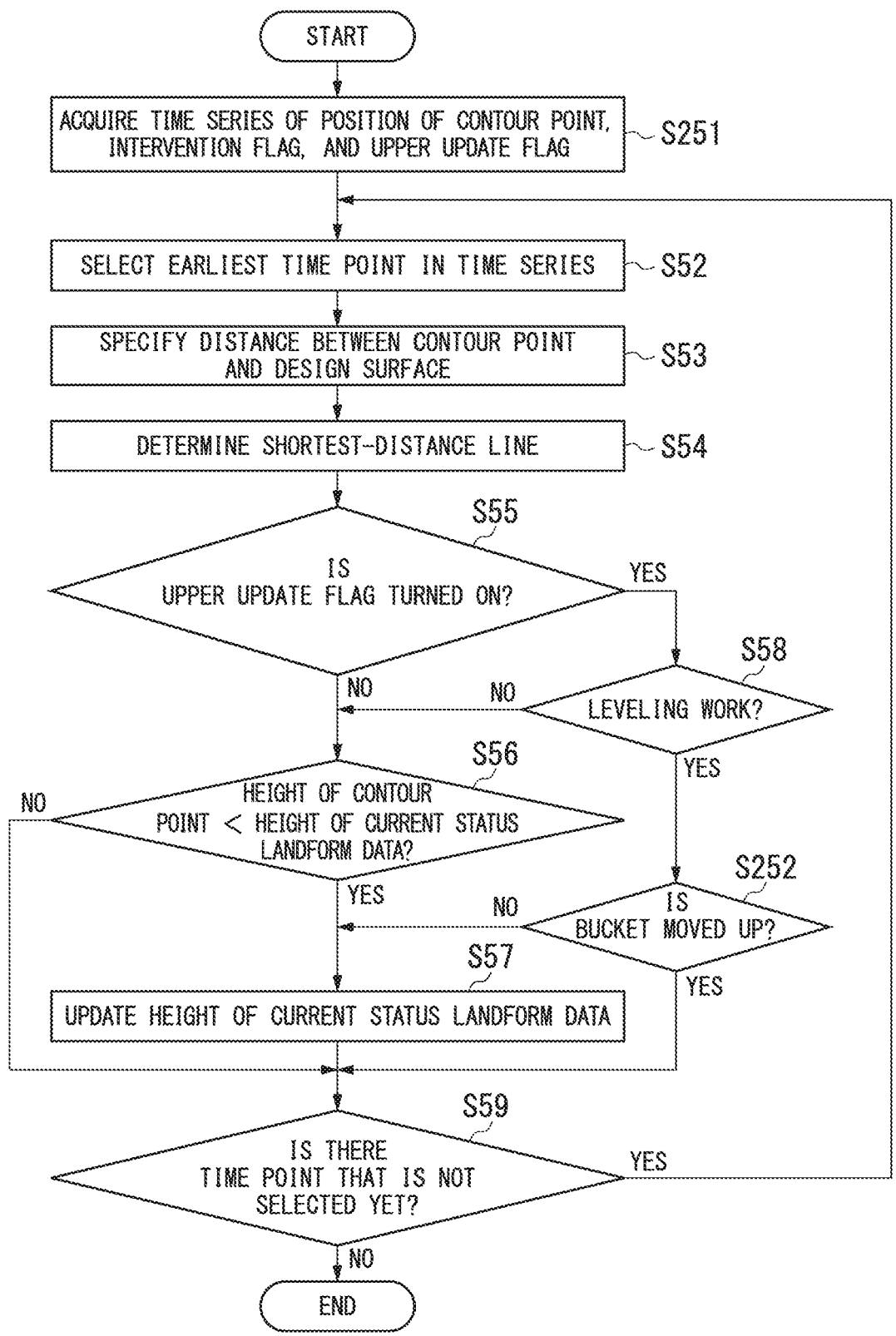
FIG. 14 is a flowchart showing an operation of a construction management device according to a third embodiment.

FIG. 14 is a flowchart showing an operation of the construction management device according to the third embodiment.

The bucket position acquisition unit 2101 of the construction management device 200 according to the third embodiment acquires a time series of positions of a plurality of contour points E of the bucket 133 in the site coordinate system, a time series of an intervention flag, a time series of an upper update flag, and a time series of an operation amount on the work equipment 130 from the work equipment control device 126 of the hydraulic excavator 100 in step S51 (step S251).

Next, the construction management device 200 executes processes in step S52 to step S55 in the same manner as in the first embodiment. The construction management device 200 according to the third embodiment executes processes in steps S56 and S57 in the same manner as in the first embodiment in a case where the upper update flag is turned off in step S55 (step S55: NO), and a work state of the work equipment 130 is not a leveling work state (step S58: NO).

On the other hand, in a case where the work state of the work equipment 130 is a leveling work state (step S58: YES), the work state specifying unit 2103 determines whether or not the bucket 133 is moved up on the basis of operation amounts on the boom 131, the arm 132, and the bucket 133 related to the selected time point (step S252). In a case where it is determined that the bucket 133 is moved up (step S252: YES), the current status landform update unit 2106 does not update a height in the current status landform data to an upper value. In other words, in a case where it is determined that the bucket 133 is moved up, the current status landform update unit 2106 prohibits the height in the current status landform data from being updated to an upper value. This is because an operator performing an operation of moving up the bucket 133 indicates that the operator intends to finish leveling work.

In a case where it is determined that the bucket 133 is moved up (step S253: YES), the current status landform update unit 2106 causes the process to proceed to step S57 and updates the height in the current status landform data on the basis of the shortest-distance line Lm (step S57).

Advantageous Effects

As mentioned above, the construction management device 200 according to the third embodiment updates a height in current status landform data when an operation of moving up the bucket 133 is not performed in a case where a work state is a leveling work state. Consequently, in the same manner as in the second embodiment, it is possible to prevent current status landform data from being wrongly updated in a case where the bucket 133 is moved up when leveling work is finished.

In other embodiments, the current status landform update unit 2106 may update a height in current status landform data to an upper value on the basis of a position of the bucket 133, for example, in a case where the position of the bucket 133 is located in a region within a predetermined range in the upward-downward direction with respect to the design surface and the work equipment 130 is operated. The region within a predetermined range of the design surface also includes a region within a predetermined range in a normal direction to the design surface. An operation on the work equipment 130 includes an operation of causing the bucket 133 to come close to the design surface and an operation of causing the bucket to become distant therefrom.

Fourth Embodiment

The construction management device 200 according to the first embodiment updates current status landform data to an upper value in a case where a work state of the work equipment 130 is a leveling work state. In contrast, the construction management device 200 according to the fourth embodiment updates current status landform data to an upper value in a case where a work state of the work equipment 130 is a rolling compaction work state. The rolling compaction work indicates work of compacting the ground by hitting earth with the bottom surface of the bucket 133. The rolling compaction work state is an example of a predetermined work state.

<<Configuration of Construction Management Device>>

The construction management device 200 according to the fourth embodiment has the same configuration as that in the first embodiment and is different from the construction management device of the first embodiment in terms of an operation of the work state specifying unit 2103.

The work state specifying unit 2103 specifies a bottom surface angle that is an angle formed between the bottom surface of the bucket 133 and the design surface on the basis of target construction data and positions of a plurality of contour points E of the bucket 133.

The work state specifying unit 2103 determines that a work state is a compaction work state in a case where a bottom surface angle is less than a predetermined angle. For example, during excavation work, the work equipment 130 is lowered toward a construction object while the teeth of the bucket 133 are directed to the design surface, and thus a bottom surface angle increases. On the other hand, during compaction work, the work equipment 130 is lowered toward a construction object while the bottom surface of the bucket 133 is directed to the design surface, and thus a bottom surface angle decreases.

<<Operation of Construction Management Device>>

Hereinafter, a description will be made of an operation method of the construction management device 200 according to the fourth embodiment.

Figure 15:
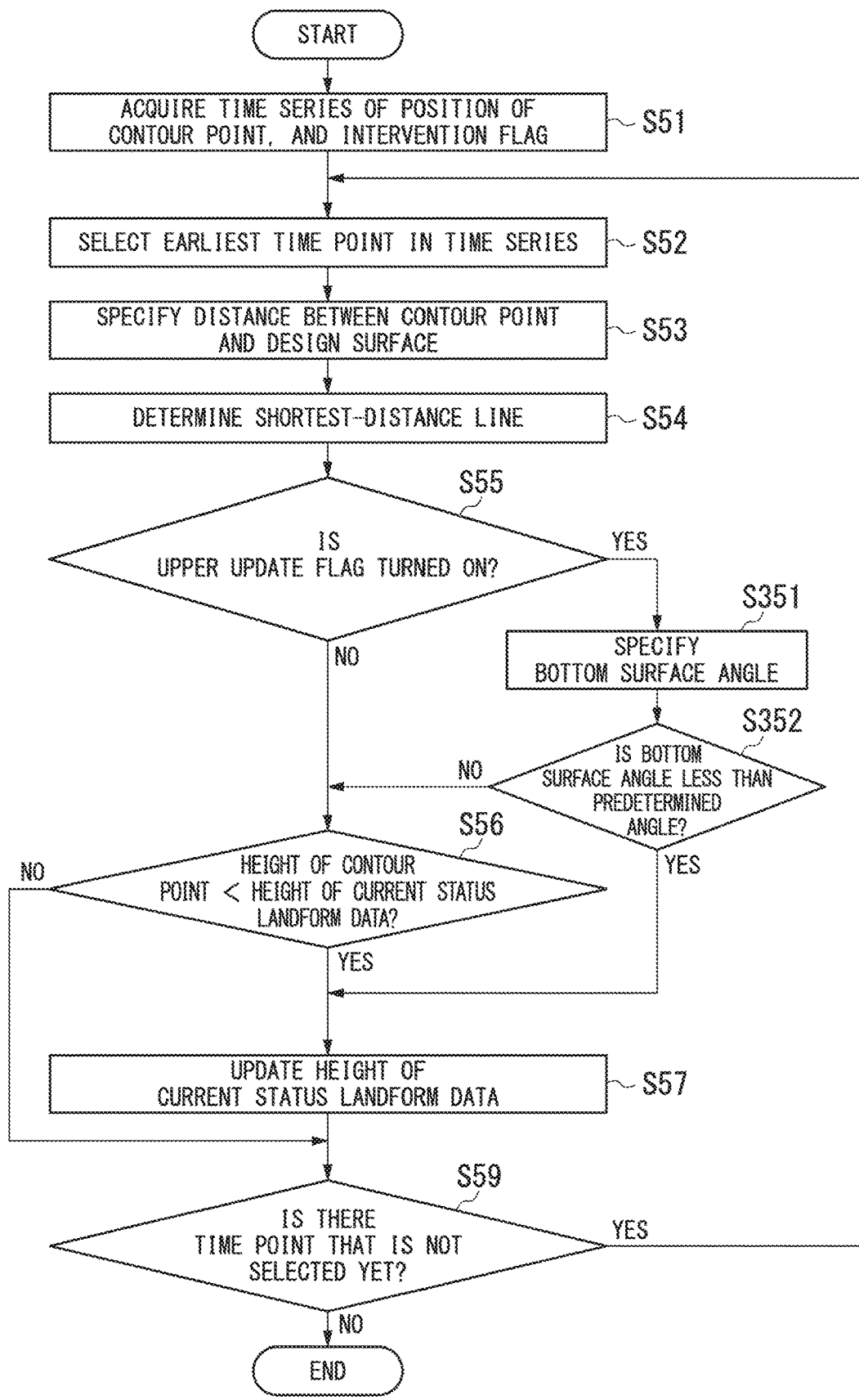
FIG. 15 is a flowchart showing an operation of a construction management device according to a fourth embodiment.

FIG. 15 is a flowchart showing an operation of the construction management device according to the fourth embodiment.

The construction management device 200 according to the fourth embodiment executes processes in step S51 to step S55 in the same manner as in the first embodiment. The construction management device 200 according to the fourth embodiment executes processes in step S56 and step S57 in the same manner as in the first embodiment in a case where the upper update flag is turned off in step S55 (step S55: NO).

On the other hand, in a case where the upper update flag is turned on (step S55: YES), the work state specifying unit 2103 specifies a bottom surface angle that is an angle formed between the bottom surface of the bucket 133 and the design surface on the basis of the positions of a plurality of contour points E selected in step S52 (step S351). Next, the work state specifying unit 2103 determines whether or not a work state is a compaction work state on the basis of the specified bottom surface angle (step S352).

In a case where it is determined that the work state is not a compaction work state (step S352: NO), that is, the bottom surface angle is equal to or more than a predetermined angle, the construction management device 200 executes the processes in step S56 and step S57 in the same manner as in the first embodiment. On the other hand, in a case where it is determined that the work state is a compaction work state (step S352: YES), that is, the bottom surface angle is less than the predetermined angle, the construction management device 200 causes the process to proceed to step S57, and updates the height in the current status landform data to a height of the contour point E regardless of whether or not the height of the contour point E is less than the height in the current status landform data.

Advantageous Effects

As mentioned above, according to the fourth embodiment, the construction management device 200 updates a height in current status landform data related to a plane position of the bucket 133 to an upper value on the basis of a height of the bucket 133 in a case where a work state is a compaction work state. Consequently, the construction management device 200 can update current status landform data at the time of a compaction operation using the hydraulic excavator 100 during banking work. In the present embodiment, compaction work is determined on the basis of a bottom surface angle, but the compaction work may be determined according to other methods, and a method of updating current status landform data may be changed.

As mentioned above, one embodiment has been described in detail with reference to the drawings, but a specific configuration is not limited to the above configuration, and various design changes may occur.

In the embodiments, as examples of predetermined work states, a leveling work state and a compaction work state have been described, but, in other embodiments, excavation work, an intervention control state, and the like may be predetermined work states.

The construction management device 200 according to the embodiments updates current status landform data by using the shortest-distance line Lm passing through the contour point E with the shortest distance to a design surface among the contour points E of the bucket 133, but is not limited thereto. For example, the construction management device 200 according to other embodiments may update current status landform data by using the shortest-distance line Lm passing through the contour point E with the shortest distance to a current status landform among the contour points of the bucket 133. For example, the construction management device 200 according to other embodiments may update current status landform data by using a line of the bucket 133 such as the teeth or the bottom surface of the bucket 133. In other embodiments, in a case where the bucket 133 is lower than the design surface, the construction management device 200 may update current status landform data by using a line through which a contour point located at the lowest side passes instead of using the shortest-distance line Lm through which the contour point E with the shortest distance to a design surface among the contour points E of the bucket 133 passes, that is, a line located at the uppermost side.

The construction management device 200 according to the embodiments determines that leveling work is being performed when intervention control is performed, but is not limited thereto. For example, the construction management device 200 according to other embodiments may fix a line for updating current status landform data to a teeth line, and then update the current status landform data to an upper side at the contour point E on the teeth line in a case where intervention control is performed, and the contour point E related to the teeth among the contour points E of the bucket 133 is closest to a design surface. The construction management device 200 according to other embodiments may update a height in current status landform data only when a height of the contour point E is less than the height in the current status landform data in a case where intervention control is performed, but the contour point E related to a part other than the teeth of the bucket 133 is closest to a design surface. This is because, generally, leveling work is performed by using the teeth of the bucket 133, and then finishing work is performed by using the bottom surface of the bucket 133.

In other embodiments, the construction management device 200 may determine whether or not work is leveling work on the basis of a lever operation (a combination of boom, arm, and bucket operations), and may determine whether or not work is leveling work by analyzing moving image data. Determination of leveling work may be performed through an artificial intelligence (AI) process by using a lever operation signal value or image data.

In other embodiments, the construction management device 200 may determine a predetermined work state such as an excavation work state or a compaction work state when pressure of a predetermined threshold value or greater is applied to the boom cylinder 134, the arm cylinder 135, or the bucket cylinder 136, and may update current status landform data to an upper side. This is because pressure is applied to the work equipment 130 during predetermined work such as excavation or compaction, and thus a work state can be determined. In other embodiments, the construction management device 200 may determine a predetermined work state such as a banking work state in a case where the bucket 133 enters a region within a predetermined range in the upward-downward direction with respect to a design surface, and may update a current status landform to an upper side. This is because movement of the bucket 133 around the design surface indicates that there is a high probability that banking work may be performed. Each of the excavation work state, the compaction work state, and the banking work state is an example of a predetermined work state.

The construction management device 200 may update a current status landform to an upper side in a case where the upper update flag is turned on, and may also update the current status landform to a lower side according to the same method as lowest-point update in a case where a lowest point of the bucket 133 is located under the current status landform. In other words, the construction management device 200 may normally update the current status landform on the basis of a bucket position.

In the embodiments, the construction management device 200 obtains the shortest-distance line Lm of the bucket 133 and uses only the contour point E on the shortest-distance line Lm for update of a current status landform, but is not limited thereto. For example, the construction management device 200 according to other embodiments may update a current status landform by using a plurality of lines of the bucket 133 respectively passing through the contour points E. In other words, a plane position differs depending on a line, and thus the construction management device 200 may determine whether or not a current status landform is to be updated for each line. In a case where there are pieces of data regarding positions of the contour points E on a plurality of lines at a predetermined plane position, height in current status landform data at the plane position may be updated by using a height of a lowest point thereamong.

The construction management device 200 according to other embodiments may update a current status landform to an upper side on the basis of other conditions instead of using the upper update flag and a determination result of leveling work. For example, the construction management device 200 according to other embodiments may perform upper update only in a case where intervention control using an intervention flag is performed. In other words, the construction management device 200 according to other embodiments may update current status landform data to an upper side in a case where a work state is an intervention control state. In this case, the intervention control state is an example of a predetermined work state.

In the embodiments, the work equipment control device 126 transmits an intervention flag and an upper update flag to the construction management device 200 in addition to bucket position information, but is not limited thereto. For example, the work equipment control device 126 according to other embodiments may turn on the upper update flag during intervention control such that only the bucket position information and the upper update flag may be transmitted to the construction management device 200. In this case, the construction management device 200 may omit the process in step S58 in FIG. 9.

In the embodiments, the work equipment control device 126 that is an on-vehicle device and the construction management device 200 that is a server share the processes, but are not limited thereto. For example, in other embodiments, one of the work equipment control device 126 and the construction management device 200 may perform all of the processes, and the work equipment control device 126 and the construction management device 200 may perform the same processes with a different assignment from the above embodiments. For example, in the embodiments, the construction management device 200 updates a current status landform, but, in other embodiments, the work equipment control device 126 may store current status landform data, and the work equipment control device 126 may update the current status landform data to an upper side. In other words, the construction management device 200 may be a device provided in a work machine.

INDUSTRIAL APPLICABILITY

The construction management device according to the present invention can update current status landform data during banking work using a work machine.

The invention claimed is:

1. A construction management device comprising:
   a current status landform storage unit that is configured to store current status landform data that include three-dimensional data representing a current status landform of a construction object, the current status landform data including a height of the current status landform;
   a bucket position acquisition unit that is configured to acquire a position of a bucket of a work machine, the work machine including work equipment that includes the bucket; and
   a current status landform update unit that is configured to, based on a work state of the work equipment corresponding to a leveling work state or a compaction work state, update the current status landform to a position that the bucket has passed and is higher than the height of the current status landform.

2. The construction management device according to claim 1, wherein the work machine has an intervention control function for decelerating the work equipment,
   wherein the bucket position acquisition unit is configured to acquire the position of the bucket and information indicating whether or not the work equipment is in a work state for performing the intervention control function, and
   wherein the work state for performing the intervention control function includes the leveling work state and the compaction work state.

3. The construction management device according to claim 1, wherein the work state further comprises an excavation work state.

4. The construction management device according to claim 1, wherein the bucket position acquisition unit is configured to acquire respective positions of a plurality of contour points that are disposed along the bucket, and
   wherein the current status landform update unit is configured to update the height of the current status landform based on a point of the bucket among the plurality of contour points that is closest to a design surface.

5. The construction management device according to claim 1, wherein the position of the bucket is defined by a plurality of contour points that are disposed along the bucket and acquired at a series of time, respectively, and
   wherein the current status landform update unit is configured to update the height of the current status landform to a height corresponding to a lowest point among the plurality of contour points of the bucket based on the work state of the work equipment corresponding to the leveling work state or the compaction work state.

6. The construction management device according to claim 1, wherein the current status landform update unit is configured to maintain the height of the current status landform without updating to the position that the bucket has passed based on the working machine performing an operation for moving up the bucket.

7. A construction management method comprising:
   acquiring a position of a bucket of a work machine, the work machine including work equipment that includes the bucket, wherein the work machine is configured to perform construction on a construction object based on current status landform data that include three-dimensional data representing a current status landform of the construction object, the current status landform data including a height of the current status landform; and
   based on a work state of the work equipment corresponding to a leveling work state or a compaction work state, updating the current status landform to a position that the bucket has passed and is higher than the height of the current status landform.

8. A display device that is configured to display a current status landform of a construction object and a bucket of work equipment provided in a work machine, the display device comprising:
   a display unit that is configured to display an image including the bucket, a line representing a design surface, and a line representing a height of the current status landform, the image being displayed in a viewpoint at which the work machine is viewed from a side,
   wherein the display unit is configured to, based on a work state of the work equipment corresponding to a leveling work state or a compaction work state, update the line representing the height of the current status landform to a position that the bucket has passed and is higher than the height of the current status landform.

9. A construction management device comprising:
   a current status landform storage unit that is configured to store current status landform data that includes three-dimensional data representing a current status landform of a construction object, the current status landform data including a height of the current status landform;
   a bucket position acquisition unit that is configured to acquire a position of a bucket of a work machine, the work machine including work equipment that includes the bucket; and
   a current status landform update unit that is configured to:
      determine whether an upper update permission condition is satisfied,
      based on determining that the upper update permission condition is not satisfied, perform a lowest-point update operation for updating the height of the current status landform to a value corresponding to a lowest point of the bucket, and
      based on determining that the upper update permission condition is satisfied, perform an upper update operation for updating the height of the current status landform to an upper value corresponding to a position above the current status landform.

10. A construction management device comprising:
   a current status landform storage unit that is configured to store current status landform data that include three-dimensional data representing a current status landform of a construction object, the current status landform data including a height of the current status landform;
   a target construction data storage unit that is configured to store a design surface of the construction object;
   a bucket position acquisition unit that acquires a position of a bucket from a work machine, the work machine including work equipment that includes the bucket;
   an operation signal acquisition unit that is configured to acquire an operation signal for an operation lever used to operate the work equipment; and
   a current status landform update unit that is configured to update the height of the current status landform to an upper value corresponding to a position of the bucket above the current status landform based on the position of the bucket being located within a predetermined range from the design surface while the work equipment is operated.

* * * * *